(12) United States Patent
Wiesenberg

(10) Patent No.: US 11,052,817 B2
(45) Date of Patent: Jul. 6, 2021

(54) CONNECTION SYSTEMS, APPARATUS, AND RELATED METHODS FOR USE WITH VEHICLE ELECTRONIC COMPONENTS

(71) Applicant: TOYOTA MOTOR ENGINEERING & MANUFACTURING NORTH AMERICA, INC., Plano, TX (US)

(72) Inventor: Ryan M. Wiesenberg, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/687,080

(22) Filed: Nov. 18, 2019

(65) Prior Publication Data

US 2021/0146826 A1 May 20, 2021

(51) Int. Cl.
*B60Q 1/26* (2006.01)
*B60Q 9/00* (2006.01)

(52) U.S. Cl.
CPC .......... *B60Q 1/2661* (2013.01); *B60Q 9/006* (2013.01)

(58) Field of Classification Search
CPC .. B60Q 1/2661; B60Q 9/006; H01R 2201/26; Y02T 10/7005; Y02T 90/14; Y02T 90/121; Y02T 90/163; Y02T 10/7088
See application file for complete search history.

(56) References Cited

U.S. PATENT DOCUMENTS

| | | | |
|---|---|---|---|
| 6,203,355 B1 * | 3/2001 | Neblett | H01R 13/62933 |
| | | | 439/372 |
| 6,339,369 B1 | 1/2002 | Paranjpe | |
| 7,046,127 B2 | 5/2006 | Boddy | |
| 7,616,102 B2 | 11/2009 | Kudelko et al. | |
| 9,004,578 B1 | 4/2015 | Ghannam et al. | |
| 9,567,021 B2 | 2/2017 | Mailey et al. | |
| 2012/0303213 A1 * | 11/2012 | Prosser | B60L 53/16 |
| | | | 701/36 |
| 2013/0040486 A1 * | 2/2013 | Kurumizawa | B60L 53/16 |
| | | | 439/350 |

FOREIGN PATENT DOCUMENTS

CN 103661128 A 3/2014

* cited by examiner

*Primary Examiner* — James J Yang
(74) *Attorney, Agent, or Firm* — Oblon, McClelland, Maier & Neustadt, L.L.P.

(57) ABSTRACT

Connection systems, apparatus, and related methods for use with vehicle electronic components are disclosed. A disclosed connection system for a vehicle includes an electronic component of the vehicle and a primary connector positioned on the electronic component. The connection system also includes a mounting feature positioned on a portion of the vehicle. The mounting feature includes a substrate and an aperture defined by the substrate. The mounting feature is configured to electrically couple the electronic component to a wiring system of the vehicle in response to insertion of the primary connector in the aperture.

7 Claims, 12 Drawing Sheets

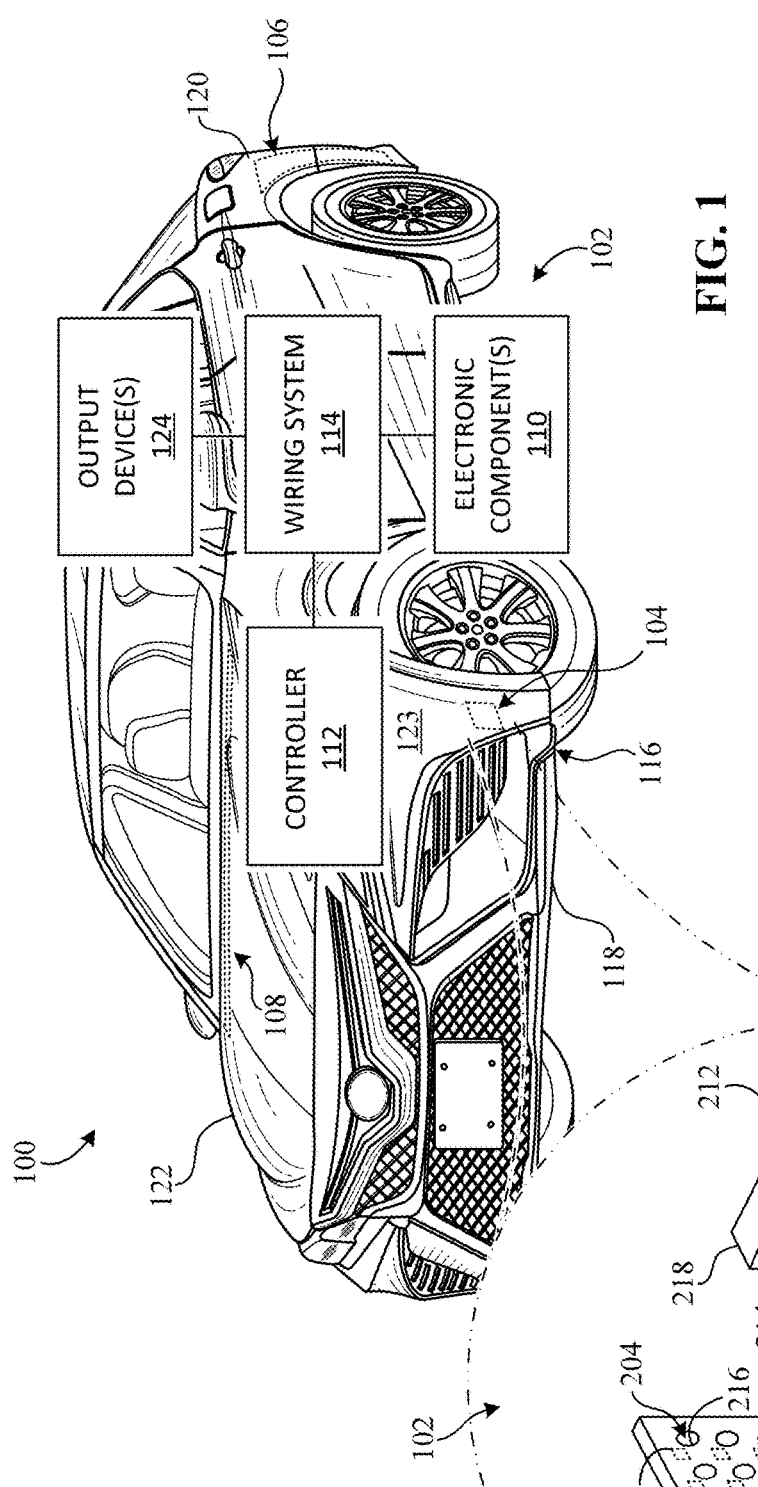
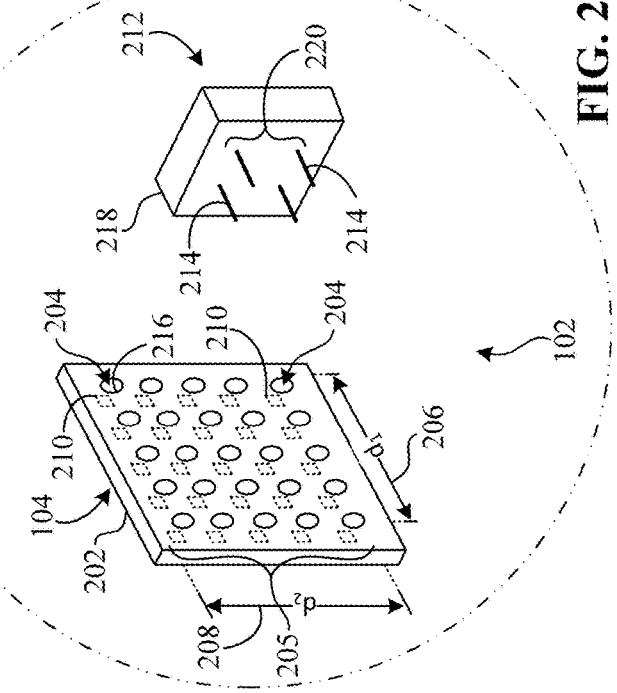
FIG. 1
FIG. 2

CONNECTION SYSTEMS, APPARATUS, AND RELATED METHODS FOR USE WITH VEHICLE ELECTRONIC COMPONENTS

FIELD OF THE DISCLOSURE

This disclosure relates generally to electronics and, more particularly, to connection systems, apparatus, and related methods for use with vehicle electronic components.

BACKGROUND

Sensor systems can be advantageously used in many different applications. For example, motor vehicles typically employ sensor systems to improve vehicle performance, safety, and/or driver comfort. In particular, a vehicle having autonomous functionality (sometimes referred to as an autonomous vehicle) utilizes different sensors that are positioned on the vehicle at locations of interest such as a roof, a fender, a side panel, etc. These sensors are often configured to detect vehicle surroundings such as objects near the vehicle, which enables an electronic control unit (ECU) to substantially drive the vehicle without assistance from a person. Additionally, in certain automotive manufacturing applications, robotic devices (e.g., a robot arm) similarly employ sensor systems to improve operational parameters or characteristics and/or enable autonomous functionality.

SUMMARY

An example connection system for a vehicle includes an electronic component of the vehicle and a primary connector positioned on the electronic component. The connection system also includes a mounting feature positioned on a portion of the vehicle. The mounting feature includes a substrate and an aperture defined by the substrate. The mounting feature is configured to electrically couple the electronic component to a wiring system of the vehicle in response to insertion of the primary connector in the aperture.

An example vehicle includes a wiring system. The vehicle also includes a mounting feature supported by a portion of the vehicle and configured to receive an electronic component having a primary connector positioned on the electronic component. The mounting feature includes a substrate and a secondary connector that is connected to the wiring system and disposed in or adjacent an aperture defined by the substrate. The secondary connector is configured to contact the primary connector when the primary connector passes into the aperture to form an electrical connection between the electronic component and the wiring system.

An example method of installing an electronic component on a vehicle includes aligning the electronic component to a mounting feature positioned on a portion of the vehicle. A connector positioned on the electronic component is insertable in an aperture defined by a substrate of the mounting feature. The method also includes inserting the connector in the aperture such that, in response to insertion of the connector in the aperture, the mounting feature electrically couples the electronic component to a wiring system of the vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 is a view of an example vehicle in which examples disclosed herein can be implemented;

FIG. 2 is a view of an example mounting feature in accordance with the teachings of this disclosure;

In general, the same reference numbers will be used throughout the drawing(s) and accompanying written description to refer to the same or like parts.

DETAILED DESCRIPTION

Figure 3:
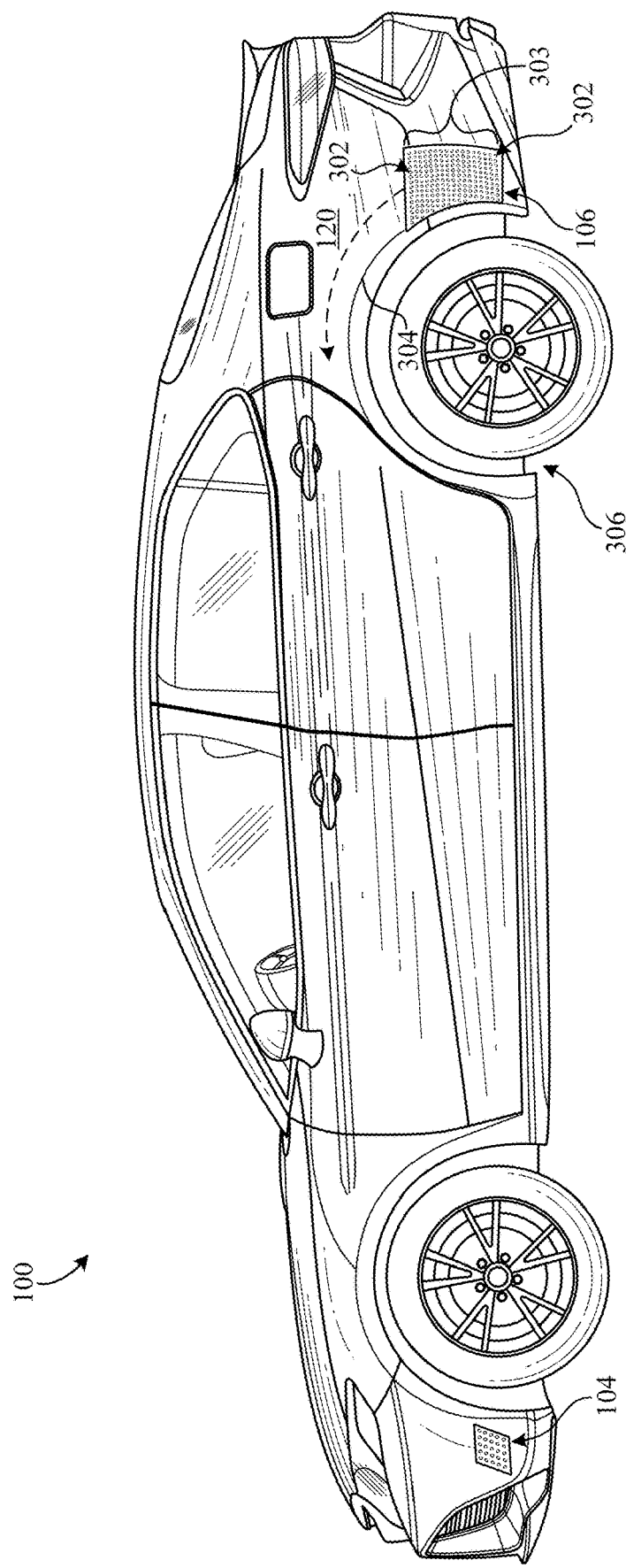
FIG. 3 is a side view of the example vehicle of FIG. 1 and shows another example mounting feature in accordance with the teachings of this disclosure.

Some known vehicles include electronic components, such as sensors, that are typically attached to a vehicle body via a series of screws, brackets, and/or snap-fit connectors that hold the electronic components in place. However, implementing such known coupling mechanisms for the electronic components increases costs associated with vehicle manufacturing and/or time associated with installing the electronic components. Additionally, coupling these electronic components to a vehicle in such a manner prevents a user from easily decoupling the electronic components from the vehicle.

Such electronic components may also include known electrical connectors for providing electrical connections between the electronic components and a central wiring system of a vehicle. For example, a sensor may include wires extending away therefrom and known electrical connectors coupled to the ends of the respective wires. These known electrical connectors are paired with and mated to particular electrical connectors of the central wiring system. However, visually identifying and/or mating such known electrical connectors together can be time consuming.

Connection systems, apparatus, and related methods for use with vehicle electronic components are disclosed. Examples disclosed herein provide an example modular connection system for a vehicle to facilitate installing, uninstalling, and/or replacing one or more example vehicle electronic components such as sensor modules, ECUs, lights, batteries, sensor suites, etc., for example, to easily upgrade vehicle capabilities without having to replace the entire vehicle and/or other components thereof. The disclosed connection system can be configured to work with any type of vehicle electronic component. In particular, the disclosed connection system includes an example mounting feature positioned on an exterior portion (e.g., a body panel or structure adjacent thereto such as a frame) or an interior portion (e.g., an interior panel, interior molding, or a structure adjacent thereto) of the vehicle in an area of interest. In particular, the disclosed mounting feature is configured to receive the electronic components and operatively couple the electronic components to the vehicle when the electronic components are particularly positioned on the mounting feature, which is discussed in greater detail below in connection with FIGS. 1-13. In some examples, in response to receiving the electronic components, the disclosed mounting feature electrically couples the electronic components to a wiring system of the vehicle. Additionally or alternatively, in some examples, the disclosed mounting feature couples (e.g., removably coupes) the electronic components to the vehicle such that the mounting feature carries the electronic components.

The disclosed mounting feature includes a substrate (e.g., a panel) and one or more apertures positioned on and/or defined by the substrate, which facilitate interfacing the electronic components with the vehicle. For example, one or more holes and/or recesses extend at least partially through the substrate. The disclosed apertures may be particularly distributed across at least a portion of an outer surface of the substrate to form an aperture pattern of interest (e.g., an array having rows and columns). For example, the apertures may be equally or evenly spaced from each. In particular, an example primary connector (e.g., a pin configured to transmit electrical power and/or data) of a first example electronic component is insertable in any one of the apertures, thereby operatively coupling the first electronic component to the vehicle. That is, the primary connector is positioned on the first electronic component, and the first electronic component can be placed on the substrate such that the primary connector extends through one of the apertures. To decouple or remove the first electronic component from the vehicle, the first electronic component is urged away from the mounting feature such that the primary connector exits the one of the apertures. Accordingly, each of the disclosed electronic components can be provided with at least one example primary connector that is similarly insertable in one of the apertures. In this manner, the disclosed electronic components can be easily placed in multiple locations on the substrate (i.e., multiple locations on the vehicle), depending on the size of the aperture pattern and/or a number of the apertures used to form the aperture pattern.

In some examples, to facilitate providing electrical connections between the disclosed electronic components and the wiring system, the mounting feature includes one or more example secondary connectors (e.g., pins and/or sockets configured to transmit electrical power and/or data) positioned thereon. The disclosed secondary connectors are connected to the wiring system and disposed in or adjacent the apertures. That is, each of the apertures is associated with at least one of the secondary connectors. In particular, during installation of the first electronic component (and/or one or more of the other disclosed electronic components), the primary connector of the first electronic component extends through one of the apertures to directly contact a corresponding one of the secondary connectors, which provides an electrical connection between the first electronic component and the wiring system.

Further, in some examples, at least some of the disclosed electronic components are implemented using multiple primary connectors. For example, four primary connectors (e.g., a power connector, a ground connector, and two data connectors) are positioned on the first electronic component. In particular, the primary connectors of the first electronic component form and/or define a connector pattern of interest that matches at least a portion of the aperture pattern of interest, which facilitates insertion of the primary connectors in the apertures. For example, each of the four primary connectors of the first electronic component is insertable in one of the apertures of the mounting feature. The connector pattern associated with the first electronic component is based on positions of the primary connectors relative to each other and, in some examples, types of the primary connectors.

Additionally, some disclosed examples provide an example controller (e.g., an ECU of the vehicle) that is connected to the wiring system. In particular, the disclosed controller is structured to detect the electronic components when the electronic components are connected to the mounting feature and, in response, configure the electronic components for operation such that the electronic components are fully operational, as discussed in greater detail below in connection with FIGS. 6-13. For example, when the first electronic component includes a sensor module, the controller can calibrate the first electronic component or facilitate self-calibration of the first electronic component. In such examples, the disclosed controller is configured to determine a location and/or an orientation of the first electronic component relative to the vehicle by detecting which ones of the secondary connectors are connected to the first electronic component. That is, because the secondary connectors, the apertures, and/or, more generally, the mounting feature are positioned on vehicle at substantially fixed locations, these locations can be predetermined and/or programmed into the controller as predetermined positional data associated with the secondary connectors. As such, the secondary connectors, when connected to the first electronic component, allow the controller to recognize where the first electronic component is relative to the vehicle. The controller then calibrates the first electronic component to match the determined location and/or orientation, or the controller provides the predetermined positional data to the first electronic component to allow for self-calibration.

As a result, disclosed examples allow a user to easily hot-swap one or more vehicle electronic components, for example, to upgrade a sensor suite, a specific sensor module, an ECU, etc., which would have otherwise been unattainable using the above-mentioned known vehicles and/or known coupling mechanisms. Disclosed examples reduce time and/or costs typically associated with installing, uninstalling, and/or replacing such vehicle electronic components. Further, the disclosed connection system can be modified and/or expanded, for example, by using multiple example mounting features positioned on the vehicle in different areas of interest, each of which can be similar or identical to the disclosed mounting feature discussed above.

Further, examples disclosed herein are not limited to vehicle applications. In some examples, the disclosed connection system can be advantageously configured for use with one or more different systems involving sensors and computing such as, for example, a robotics platform and/or a mobility system. Such disclosed examples similarly facilitate installing, uninstalling, and/or replacing one or more related electronic components for a wide-range of devices that includes, but is not limited to, a robotic device (e.g., a robot arm) associated with an automotive manufacturing plant or facility, a robotic device (e.g., autonomous vacuum cleaner) associated with personal care, a mobility device (e.g., a wheelchair), etc.

FIG. 1 is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example connection system 102, which includes one or more example mounting features 104, 106, 108, one or more example vehicle electronic components 110, an example controller 112, and an example vehicle wiring system 114 connecting the mounting feature(s) 104, 106, 108 to the controller 112. As will be discussed in detail below in connection with FIGS. 2-13, the connection system 102 of FIG. 1 facilitates installing, uninstalling, and/or replacing the vehicle electronic component(s) 110, for example, to improve functionality of the vehicle 100 such as autonomous vehicle functionality. In particular, each of the mounting feature(s) 104, 106, 108 of FIG. 1 is configured to receive one or more of the electronic component(s) 110 (e.g., a sensor suite) and operatively couple the electronic component(s) 110 to the vehicle 100. For example, the electronic component(s) 110 are positionable on and/or connectable to the first mounting feature 104, the second mounting feature 106, the third mounting feature 108, or a combination thereof. In some examples, in response to receiving the electronic component(s) 110, the mounting feature(s) 104, 106, 108 is structured and/or configured to electrically couple the electronic component(s) 110 to the wiring system 114. Additionally or alternatively, in some examples, each of the mounting feature(s) 104, 106, 108 is structured and/or configured to couple (e.g., removably couple) the electronic component(s) 110 to the vehicle 100 such that a mounting feature structure carries the electronic component(s) 110.

Each of the mounting feature(s) 104, 106, 108 of FIG. 1 is positioned on and/or coupled to an exterior portion (e.g., a body panel or structure adjacent thereto such as a frame) 116 of the vehicle 100, for example, at different locations of interest on the vehicle 100. Three of the mounting feature(s) 104, 106, 108 are shown in the illustrated example of FIG. 1 (i.e., a first mounting feature 104, a second mounting feature 106, and a third mounting feature 108), which are represented by the dotted/dashed lines of FIG. 1. According to the illustrated example of FIG. 1, the first mounting feature 104 is positioned on or adjacent a first body panel (e.g., a bumper or bumper end) 118 of the vehicle 100, the second mounting feature 106 is positioned on or adjacent a second body panel portion (e.g., a quarter panel) 120 of the vehicle 100, and the third mounting feature 108 is positioned on or adjacent a third body panel or portion (e.g., a hood) 122 of the vehicle 100. However, in some examples, the mounting feature(s) 104, 106, 108 are positioned on the vehicle 100 differently. For example, one or more of the mounting features 104, 106, 108 of FIG. 1 may be positioned on a vehicle roof, a vehicle fender, a vehicle wheel arch panel, a vehicle valance panel, a vehicle rocker panel, a vehicle gate (e.g., a tailgate, a lift gate, a swing gate, etc.), a vehicle door, etc. and/or any other suitable exterior portion of the vehicle 100.

In some examples, after installation, the mounting feature(s) 104, 106, 108 and/or the electronic component(s) 110 thereon are covered by an outer surface 123 of the vehicle 100 such that the mounting feature(s) 104, 016, 108 and/or the electronic component(s) 110 are not visible to a person. According to the illustrated example of FIG. 1, the outer surface 123 of the vehicle 100 extends over one or more (e.g., all) of the mounting feature(s) 104, 106, 108 and/or the electronic component(s) 110. In such examples, the outer surface 123 of the vehicle 100 corresponds to and/or is implemented by, for example, one or more (e.g., all) of the first body panel 118, the second body panel 120, the third body panel 122, and/or any other suitable vehicle panel. Additionally or alternatively, in some examples, the outer surface 123 of FIG. 1 corresponds to and/or is implemented by a particular component (e.g., a shell) of the connection system 102, which is discussed in greater detail below in connection with FIGS. 4 and 5.

Although FIG. 1 depicts each of the mounting feature(s) 104, 106, 108 particularly positioned on the vehicle 100, in some examples, one or more of mounting feature(s) 104, 106, 108 of the connection system 102 are implemented in the vehicle 100 differently. In such examples, one or more of the mounting feature(s) 104, 106, 108 are disposed inside the vehicle 100, for example, within a cabin of the vehicle 100, within an engine bay of the vehicle 100, etc. In particular, in such examples, the mounting feature(s) 104, 106, 108 are positioned on and/or coupled to an interior portion (e.g., an interior panel, interior molding, or a structure adjacent thereto) of the vehicle 100. Implementing the mounting feature(s) 104, 106, 108 inside the vehicle 100 in such a manner facilitates interfacing particular one(s) of the electronic component(s) 110 with the vehicle 100 such as, for example, one or more of a driver monitor camera, a radio, a component associated with heating, ventilation and air conditioning (HVAC), etc.

The electronic component(s) 110 can be implemented, for example, using (a) one or more sensor modules, (b) one or more ECUs (e.g., an autonomous control module), (c) one or more lights, (d) one or more batteries, (e) etc., (f) any other suitable vehicle electronic component, or (g) a combination thereof. Such sensor module(s) in accordance with the teachings of this disclosure include, but are not limited to, (a) image sensors, (b) cameras, (c) proximity sensors (e.g., radar sensors, sonar sensors, light detection and ranging (LiDAR) sensors etc.), (d) etc., (e) any other suitable vehicle sensor(s) or sensing device(s), or (f) a combination thereof. In particular, the electronic component(s) 110 of FIG. 1 are configured to operatively couple to the vehicle 100 via at least one of the mounting feature(s) 104, 106, 108, as previously mentioned.

The controller 112 of FIG. 1 can be implemented, for example, using one or more ECUs of the vehicle 100 and/or any other suitable computing device(s). In such examples, the controller 112 is implemented by the vehicle 100. In particular, when the electronic component(s) 110 are connected to the mounting feature(s) 104, 106, 108, the controller 112 of FIG. 1 is communicatively coupled to the electronic component(s) 110, for example, via the wiring system 114. For example, the controller 112 provides data to the electronic component(s) 110 and/or receives data from the electronic component(s) 110. Additionally or alternatively, in some examples, the controller 112 of FIG. 1 is implemented by at least one of the electronic component(s) 110. In any case, the controller 112 of FIG. 1 is sometimes referred to as a vehicle controller.

In some examples, the controller 112 of FIG. 1 is structured to detect the electronic component(s) 110 and, in response to the detection, configure the electronic component(s) 110 for operation such that the electronic component(s) 110 are fully operational, which is discussed in greater detail below in connection with FIGS. 6-13. In such examples, to facilitate identifying the electronic component(s) 110 and/or carrying out calibration thereof, the controller 112 is also configured to detect (a) one or more electrical connections formed by electrical connectors associated with the mounting feature(s) 104, 106, 108 and the electronic component(s) 110 and/or (b) one or more characteristics and/or parameters of the electrical connection(s).

The vehicle wiring system 114 of FIG. 1 facilitates transmitting electrical power and/or data between different components of the vehicle 100. For example, when the electrical connection(s) are formed, the wiring system 114 communicatively couples the controller 112 to the electronic component(s) 110 such that the controller 112 and the electronic components 110 can communicate with each other. In some examples, the wiring system 114 electrically couples the electronic component(s) 110 to a power source (e.g., a battery) of the vehicle 100 such that the electronic component(s) 110 can receive electrical power from the power source. In some such examples, the power source corresponds to and/or is implemented by at least one of the electronic component(s) 110 installed on the vehicle 100. In particular, the wiring system 114 of FIG. 1 includes one or more conductors (e.g., one or more wires, one or more cables, etc.) extending through the vehicle 100. In some examples, the wiring system 114 includes and/or forms part of a network (e.g., a controller area network (CAN) bus) of the vehicle 100. This network can include sub-networks that are communicatively coupled together via one or more wired and/or wireless communication links. In some such examples, at least another vehicle controller is operatively interposed between the sub-networks, for example, to decode messages and/or for security purposes.

In some examples, to convey information (e.g., audible information and/or visual information) to one or more users (e.g., vehicle servicer personnel), the connection system 102 of FIG. 1 also includes one or more example output device(s) 124. The output device(s) 124 of FIG. 1A can be implemented, for example, using a light-emitting diode (LED), a liquid crystal display, a touchscreen, a speaker, and/or any other device(s) for providing or presenting information to a person. The output device(s) 124 of FIG. 1A are communicatively coupled to the controller 112, for example, via the wiring system 114. In particular, the controller 112 is configured to control the output device(s) 124 to notify the user(s) of one or more calibration instructions associated with the electronic component(s) 110 and/or instruct the user(s) to perform a user operation in accordance with the calibration instruction(s). As will be discussed further below, the electronic component(s) 110 may be provided with embedded guidelines for operations that should take place during calibration.

In some examples the controller 112 controls the output device(s) 124 to present one or more images and/or a video (e.g., a pop-up message or window, text or characters, symbols, etc.) to the user(s) in accordance with the calibration instruction(s), for example, instructing a user or person to place a target or object at a predetermined location relative to the vehicle 100 (e.g., 20 feet in front of the vehicle 100) for detection by one or more sensor modules. Additionally or alternatively, the controller 112 controls the output device(s) 124 to generate sound such as, for example, a chime and/or speech (e.g., one or more natural language phrases and/or sentences).

Additionally or alternatively, in some examples, the controller 112 instructs an external mechanism to carry out the calibration instruction(s). Such an external mechanism can include at least one automated or controllable mechanism such as a calibration machine, a vehicle, a mobile device, etc., which acts as the target or object for detection by the sensor module(s). For example, based on the calibration instruction(s), the controller 112 instructs the external device to move to a certain position.

FIG. 2 is a view of the first mounting feature 104. According to the illustrated example of FIG. 2, the first mounting feature 104 includes an example layer or substrate 202 corresponding to an area of the exterior portion 116 on which the electronic component(s) 110 are positionable. The first mounting feature 104 of FIG. 2 also includes multiple apertures (e.g., holes and/or recesses) 204 positioned on and/or defined by the substrate 202, twenty-five (25) of which are shown in this example. Each of the apertures 204 of FIG. 2 extends at least partially through the substrate 202. In some examples, the apertures 204 are particularly distributed across at least a portion of an outer surface of the substrate 202 to form a first example aperture configuration or pattern 205, which facilitates interfacing the electronic component(s) 110 with the vehicle 100. In particular, each of the apertures 204 is configured to receive and/or retain a portion (e.g., a connector) of an electronic component 110. More particularly, in some examples, at least a portion of the first aperture pattern 205 matches one or more connector patterns associated with the electronic component(s) 110, as discussed further below.

As shown in FIG. 2, the first aperture pattern 205 includes a 5×5 array (i.e., an array having five rows and five columns) that is square-shaped and extends across substantially the entire outer surface of the substrate 202. For example, the first aperture pattern 205 is associated with a first dimension (e.g., a length) 206 and a second dimension (e.g., a height) 208 substantially the same relative to the first dimension 206. Additionally, as shown in FIG. 2, the apertures 204 are evenly spaced from each other. Further, the first aperture pattern 205 of FIG. 2 can be expanded, for example, by using one or more additional apertures 204. On the other hand, in some examples, the first aperture pattern 205 of FIG. 2 is implemented using one or more fewer apertures 204 (e.g., at least one aperture). As such, the first aperture pattern 205 can be configured to include an array having any suitable size and/or shape.

Although FIG. 2 depicts the first aperture pattern 205, in some examples, the apertures 204 of FIG. 2 are arranged relative to the substrate 202 differently to provide a different aperture pattern. In some examples, such an aperture pattern can have a particular shape or geometry that substantially conforms a shape or geometry corresponding to an area of the exterior portion 116, which is discussed further below in connection with FIG. 3. Further, although FIG. 2 depicts the multiple apertures 204, in some examples, the first mounting feature 104 is implemented using only one of the apertures 204 of FIG. 2 (i.e., a single aperture).

According to the illustrated example of FIG. 2, to facilitate providing one or more electrical connections between the electronic component(s) 110 and the wiring system 114, the connection system 102 also includes multiple secondary connectors (e.g., electrical connectors such as pins or sockets) 210 connected to the wiring system 114 and operatively coupled to, for example, the first mounting feature 104. In other words, the first mounting feature 104 of FIG. 2 includes the secondary connectors 210. Twenty-five (25) of the secondary connectors 210 are shown in the illustrated example of FIG. 2. Each of the secondary connectors 210 of FIG. 2 is positioned on and/or supported by the substrate 202. As shown in FIG. 2, a single primary connector 210 is disposed in or adjacent each of the apertures 204. However, in some examples, multiple secondary connectors 210 are disposed in each of the apertures 204. In particular, each of the secondary connectors 210 is configured to receive and/or contact a connector of an electronic component 110, thereby forming the electrical connection(s). Although FIG. 2 depicts the multiple secondary connectors 210, in some examples, the first mounting feature 104 is implemented differently, for example, using only one of the secondary connectors 210 of FIG. 2 (i.e., a single secondary connector). As such, in examples where the first mounting feature 104 includes a single aperture 204, a single secondary connector 210 of the connection system 102 is disposed in or adjacent the single aperture 204.

The substrate 202 of the first mounting feature 104 is constructed of, for example, one or more metals (e.g., aluminum, steel, etc.), one or more plastics, etc., and/or any other suitable material(s). In some examples, the first mounting feature 104 is part of a body panel (e.g., one of the first, second, or third body panel 118, 120, 122) of the vehicle 100. For example, the substrate 202 and the body panel form an integral or single-piece component such that the substrate 202 and the body panel share a cross-sectional area (i.e., the same cross-sectional area). In such examples, the first mounting feature 104 is produced by forming the apertures 204 on the body panel of the vehicle 100 (e.g., via one or more automotive manufacturing processes and/or techniques) and coupling the secondary connectors 210 to the body panel. Alternatively, in some examples, the substrate 202 and the body panel are produced separately and then coupled together, for example, via one or more fasteners and/or one or more fastening methods or techniques.

According to the illustrated example of FIG. 2, the connection system 102 also includes a first example electronic component 212 for the vehicle 100. In some examples, the first electronic component 212 of FIG. 2 corresponds to and/or is used to implement at least one of the electronic component(s) 110 of FIG. 1. According to the illustrated example of FIG. 2, the connection system 102 also includes multiple primary connectors (e.g., electrical connectors such as pins) 214 operatively coupled to the first example electronic component 212. Four of the primary connectors 214 are shown in the illustrated example of FIG. 2. In particular, the primary connectors 214 of FIG. 2 are connected to circuitry of the first electronic component 212 and configured to connect to the first electronic component 212 to the first mounting feature 104. In some examples, each of the primary connectors 214 of FIG. 2 is insertable in one of the multiple apertures 204, thereby electrically coupling the first electronic component 212 to the wiring system 114. For example, when a first one of the primary connectors 214 is inserted in or passes into a first one of the apertures 204, the first one of the primary connectors 214 directly contacts a first one of the secondary connectors 210 corresponding to the first one of the apertures 204.

Additionally or alternatively, in some examples, as a result of such insertion of the primary connectors 214 in the apertures 204, the first electronic component 212 couples (e.g., removably couples) to the first mounting feature 104 such that the substrate 202 carries the first electronic component 212. In such examples, each of the primary connectors 214 is sized and/or shaped to tightly fit within one of the apertures 204. Additionally or alternatively, in such examples, each of the apertures 204 of FIG. 2 is sized and/or shaped to hold one of the primary connectors 214. For example, a surface 216 of the substrate 202 forming the first one of the apertures 204 imparts a force on the first one of the primary connectors 214, which substantially prevents the first electronic component 212 from separating from the substrate 202 (e.g., while the vehicle 100 is moving and/or performing a maneuver). Stated differently, the force imparted on the first one of the primary connectors 214 by the surface 216 of the substrate 202 retains the primary connectors 214 in the first one of the apertures 204. However, such a force and/or associated friction may not prevent a user from separating the first electronic component 212 from the substrate 202. For example, when a user urges the first electronic component 212 away from the first mounting feature 104 and/or applies a particular force to the first electronic component 212, the first one of the primary connectors 214 slides out of and/or exits the first one of the apertures 204. Similarly, when the secondary connectors 210 are implemented using sockets, the sockets can be sized and/or shaped to retain the primary connectors 214. Alternatively, the first electronic component 212 may be coupled to the first mounting feature 104 in any other suitable manner, for example, using one or more snap-fitting methods or techniques.

Thus, to install the first electronic component 212 of FIG. 2 on the vehicle 100 via the first mounting feature 104, the first electronic component 212 is particularly positioned and/or oriented relative to the first mounting feature 104 such that each of the primary connectors 214 aligns to one of the apertures 204. In some examples, to facilitate such alignment of the first electronic component 212 and the first mounting feature 104, spacing associated with the apertures 204 is substantially the same relative to spacing associated with the primary connectors 214. Then, the first electronic component 212 of FIG. 2 is urged toward the substrate 202 such that each of the primary connectors 214 enters one of the apertures 204, thereby operatively coupling the first electronic component 212 to the vehicle 100. In this manner, the first electronic component 212 can be positioned on the vehicle 100 in multiple locations, depending on the size of the first aperture pattern 205 or a number of the apertures 204.

The first electronic component of FIG. 2 includes a body 218 on which the primary connectors 214 are positioned. The primary connectors 214 are coupled to the body 218, for example, via one or more example fasteners and/or one or more example fastening methods or techniques. As shown in FIG. 2, each of the primary connectors 214 extends away from the body 218. Further, the primary connectors 214 of FIG. 2 are substantially parallel relative to each other.

According to the illustrated example of FIG. 2, each of the primary connectors 214 is a male connector such as, for example, a pin configured to transmit electrical power and/or data. In some such examples, each of the secondary connectors 210 of FIG. 2 is a female connector such as, for example, a socket configured to transmit electrical power and/or data. However, in some examples, the primary and secondary connectors 214, 210 are implemented differently, for example, such that each of the secondary connectors 210 is a male connector and each of the primary connectors 214 is a female connector. Further, in some examples, each of the primary and secondary connectors 214, 210 is implemented using a pin.

When the first mounting feature 104 is implemented in the vehicle 100, the first mounting feature 104 has a substantially fixed position relative to the vehicle 100. Similarly, each of the apertures 204 and/or the secondary connectors 210 also has a substantially fixed position relative to the vehicle 100. In some examples, such fixed positions are determined (e.g., by a user) and related positional data (e.g., predetermined positional data) is programmed into the controller 112 of the connection system 102 and associated with the secondary connectors 210, which enables the controller 112 to determine a location and/or an orientation of the first electronic component 212 relative to the vehicle 100 for calibration. As such, the controller 112 is configured to determine which ones of the secondary connectors 210 are connected to the primary connectors 214 and access the related positional data.

In some examples, the primary connectors 214 of FIG. 2 form and/or define a first connector configuration or pattern 220 associated with the first electronic component 212 that can be detected by the controller 112. The first connector pattern 220 of FIG. 2 matches at least a portion of the first aperture pattern 205, which facilitates aligning the primary connectors 214 to the apertures 204. In such examples, the first connector pattern 220 is based on positions of the respective primary connectors 214 relative to each other and/or the types of the respective primary connectors 214. Such a connector pattern 220 can be indicative of a type of the first electronic component 212, as discussed further below in connection with FIGS. 6-8. In such examples, the controller 112 is configured to identify the first electronic component 212 based on the first connector pattern 220. For example, when the primary connectors 214 are mated with the secondary connectors 210, the controller 112 is configured to detect the first connector pattern 220 and, in response, determine that the first electronic component 212 includes at least one of a sensor module, an ECU, a light, and/or a battery.

According to the illustrated example of FIG. 2, at least one of the primary connectors 214 is a power connector associated with powering the first electronic component 212. For example, the power connector (i.e., one of the primary connectors 214) is structured and/or configured to transmit an electric current from the power source of the vehicle 100 to the first electronic component 212 when the power connector is in direct contact with one of the secondary connectors 210. Further, in some such examples, the power connector is also structured and/or configured to transmit data between the first electronic component 212 and the controller 112 when the power connector is in direct contact with one of the secondary connectors 210, for example, via one or more methods or techniques related to power line communication. That is, in such examples, the power connector communicatively couples the first electronic component 212 to the controller 112.

Additionally, in some examples, at least one of the primary connectors 214 is a ground connector associated with grounding the first electronic component 212. For example, the ground connector (i.e., one of the primary connectors 214) connects the first electronic component 212 to a frame or chassis of the vehicle 100 and/or a negative battery terminal of the vehicle 100 when the ground connector is in direct contact with one of the secondary connectors 210. Additionally, in some examples, at least one of the primary connectors 214 is a data connector associated with transmitting data between the first electronic component 212 and the controller 112. For example, the data connector (i.e., one of the primary connectors 214) communicatively couples the first electronic component 212 to the controller 112 when the data connector contacts one of the secondary connectors 210.

Although FIG. 2 depicts the multiple primary connectors 214, in some examples, the first electronic component 212 is implemented differently, for example, using only one of the primary connectors 214 of FIG. 2 (i.e., a single primary connector) such as, for example, a power connector. In such examples, the single primary connector 214 is insertable in any one of the multiple apertures 204 associated with the first mounting feature 104 to electrically couple the first electronic component to the wiring system 114. Further, although FIG. 2 depicts aspects in connection with the first mounting feature 104, in some examples, such aspects likewise apply to one or more other mounting features of the connection system 102 such as, for example, the second mounting feature 106 and/or the third mounting feature 108. Further still, although FIG. 2 depicts aspects in connection with the first electronic component 212, in some examples, such aspects likewise apply to one or more of the other electronic component(s) 110 of the connection system 102 such as, for example, one or more (e.g., all) of the second electronic component 602, the third electronic component 604, the fourth electronic component 606, the fifth electronic component 702, the sixth electronic component 704, the seventh electronic component 706, the eighth electronic component 708, the ninth electronic component 710, the tenth electronic component 802, the eleventh electronic component 804, the twelfth electronic component 806, and/or the thirteenth electronic component 808 discussed below.

FIG. 3 is a side view of the vehicle 100 of FIG. 1 and shows the second mounting feature 106. According to the illustrated example of FIG. 3, the second mounting feature 106 includes multiple apertures (e.g., one or more holes and/or recesses) 302 that are positioned on and/or formed by the second body panel 120 of the vehicle 100. Each of the apertures 302 extends at least partially through the second body panel 120. In some examples, the apertures 302 of the second mounting feature 106 are particularly distributed across at least a portion of an outer surface of the second panel 120 to form a second aperture pattern 303, which facilitates interfacing the electronic components 110, 212 with the vehicle 100. In particular, each of the apertures 302 is sized and/or shaped to receive and/or retain a portion of an electronic component 110, 212, similar to the apertures 204 of the first mounting feature 104.

According to the illustrated example of FIG. 3, the second aperture pattern 303 conforms to a contour of the second body panel 120, which reduces costs associated with producing such mounting feature(s) 104, 106, 108. For example, at least some of the apertures 302 of FIG. 3 are distributed on and/or positioned along a body line 304 of the second body panel 120. As shown in FIG. 3, the second aperture pattern 303 formed by the apertures 302 extends at least partially around a wheel well 306 of the vehicle 100. In other words, the apertures 302 of the second mounting feature 106 are radially distributed relative to an axis associated with the wheel well 306. Additionally, in some examples, the second aperture pattern 303 of FIG. 3 may be expanded to extend further across the outer surface the second body panel 120, thereby providing additional locations of the second body panel 120 in which the electronic components 110, 212 can connect to the second mounting feature 106. For example, the apertures 302 can be distributed on the entire outer area of the second body panel 120.

Figure 4:
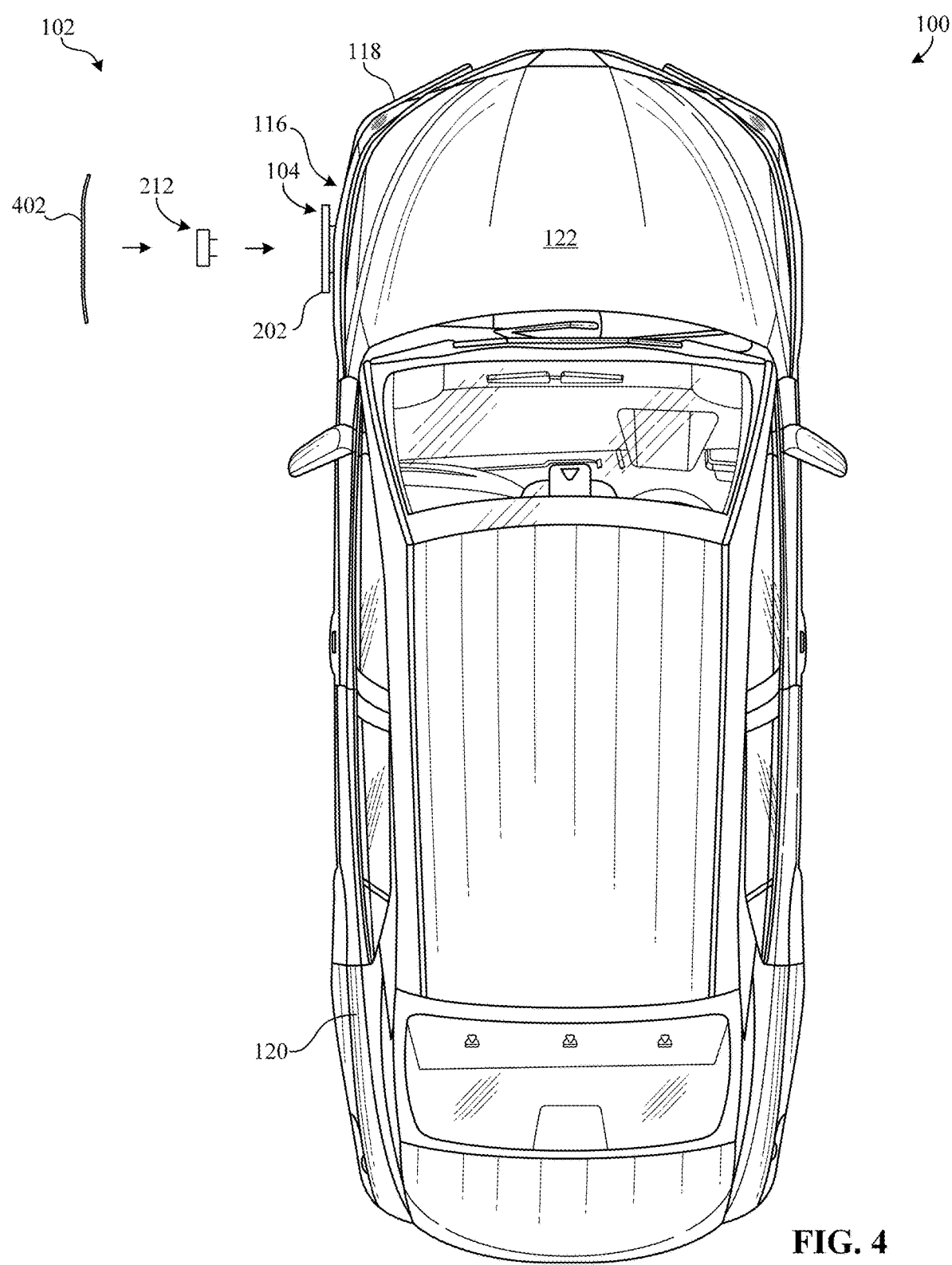
FIGS. 4 and 5 are top views of the example vehicle of FIG. 1 and show another example mounting feature in accordance with the teachings of this disclosure.
Figure 5:
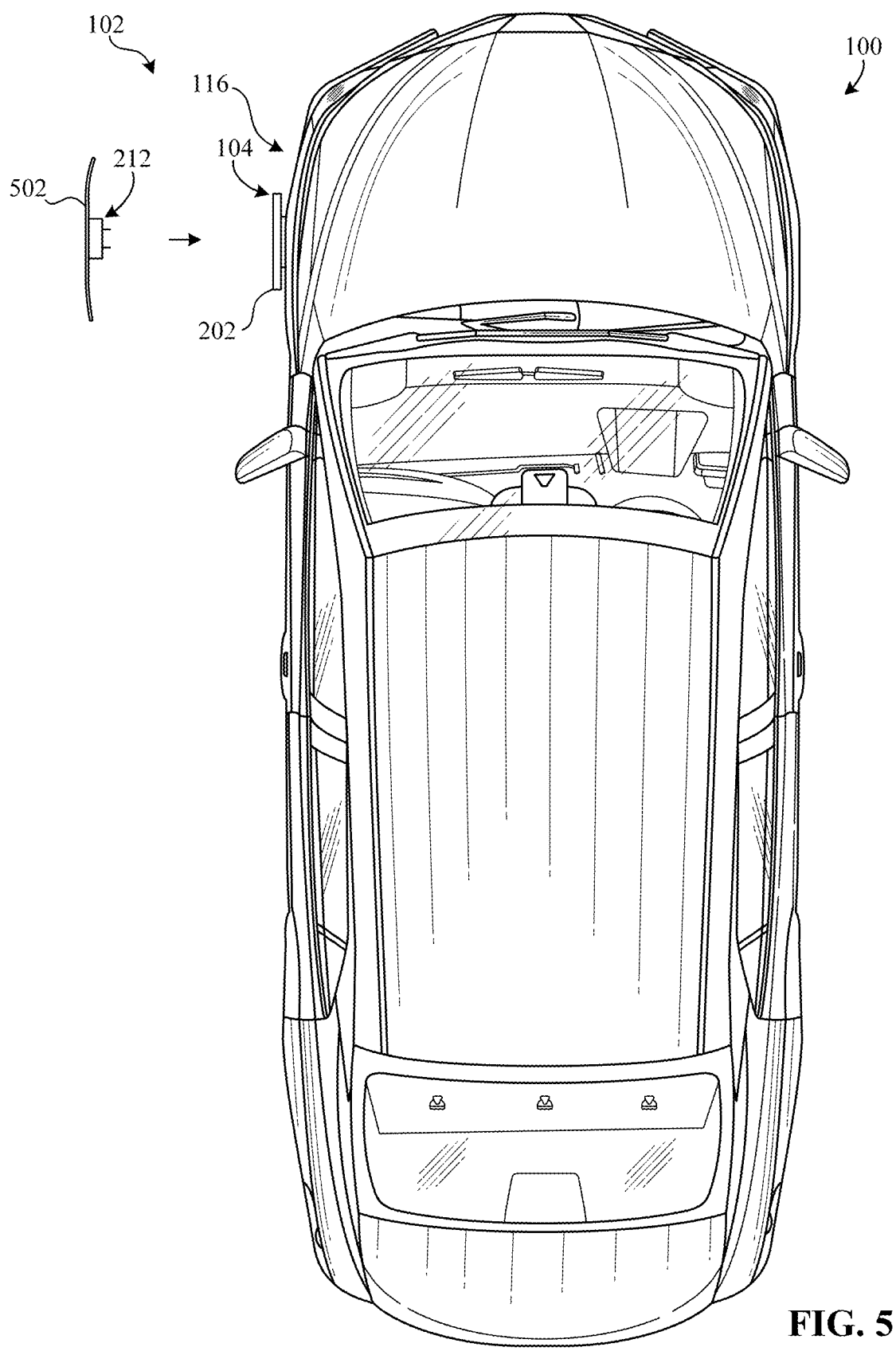

FIGS. 4 and 5 are top views of the vehicle 100 of FIG. 1 and show the first mounting feature 104. The first mounting feature 104 of FIGS. 4 and 5 is coupled to part of the exterior portion 116 of the vehicle 100 such that the substrate 202 is supported by a portion (e.g., a frame or chassis) of the vehicle 100. Further, the first mounting feature 104 of FIGS. 4 and 5 is exposed to an environment external to the vehicle 100. Turning in detail to FIG. 4, the connection system 102 also includes a first shell 402 separated from the first mounting feature 104, which facilitates securing a position and/or an orientation of an electronic component 110, 212 relative to the first mounting feature 104. In particular, the first shell 402 of FIG. 4 is configured to provide cover to the first mounting feature 104 and one or more of the electronic components 110, 212 when the electronic component(s) 110, 212 is/are connected to the first mounting feature 104.

As shown in FIG. 4, the first electronic component 212 of FIG. 4 is aligned to the first mounting feature 104 and positioned between the first mounting feature 104 and the first shell 402. In such examples, the first shell 402 is configured to urge the first electronic component 212 toward the first mounting feature 104 and/or into engagement with the first mounting feature 104, for example, before or after the first electronic component 212 is placed on the first mounting feature 104. For example, the first shell 402 imparts a force on the electronic component 212, a component of which is directed toward the first mounting feature 104. Additionally, the first shell 402 of FIG. 4 is configured to couple to a portion (e.g., a frame, chassis, or a vehicle panel) the vehicle 100, for example, via one or more fasteners and/or one or more fastening methods or techniques. In this manner, the first shell 402 of FIG. 4 sufficiently holds the first electronic component 212 (and/or the other electronic component(s) 110) in place relative to the first mounting feature 104 and at least partially forms the outer surface 123 of the vehicle 100.

In some examples, the shell 402 corresponds to and/or is implemented by a panel of the vehicle 100 such as, for example, one of the first body panel 118, the second body panel 120, the third body panel 122, etc. Alternatively, in some examples, the first shell 402 is component that is produced separately from the panel of the vehicle 100 and configured to couple to the panel. In such examples, the first shell 402 is constructed of, for example, one or more metals, one or more plastics, etc., and/or any other suitable material(s).

Turning in detail to FIG. 5, the connection system 102 also includes a second shell 502, similar to the first shell 402. Unlike the illustrated example of FIG. 4, the second shell 502 of FIG. 5 is coupled to one or more of the electronic components 110, 212 such that the second shell 502 and the electronic component(s) 110, 212 form and/or define an integral or single-piece component, for example, via one or more fasteners and/or one or more fastening methods or techniques. As such, the second shell 502 and the electronic component(s) 110, 212 coupled thereto move cooperatively, which reduces time and/or costs associated with such assembly. In particular, the second shell 502 of FIG. 5 is configured to couple to a portion of the vehicle 100 and urge the electronic component(s) 110, 212 into engagement with the first mounting feature 104. As shown in FIG. 5, the second shell 502 is coupled only to the first electronic component 212.

Figure 6:
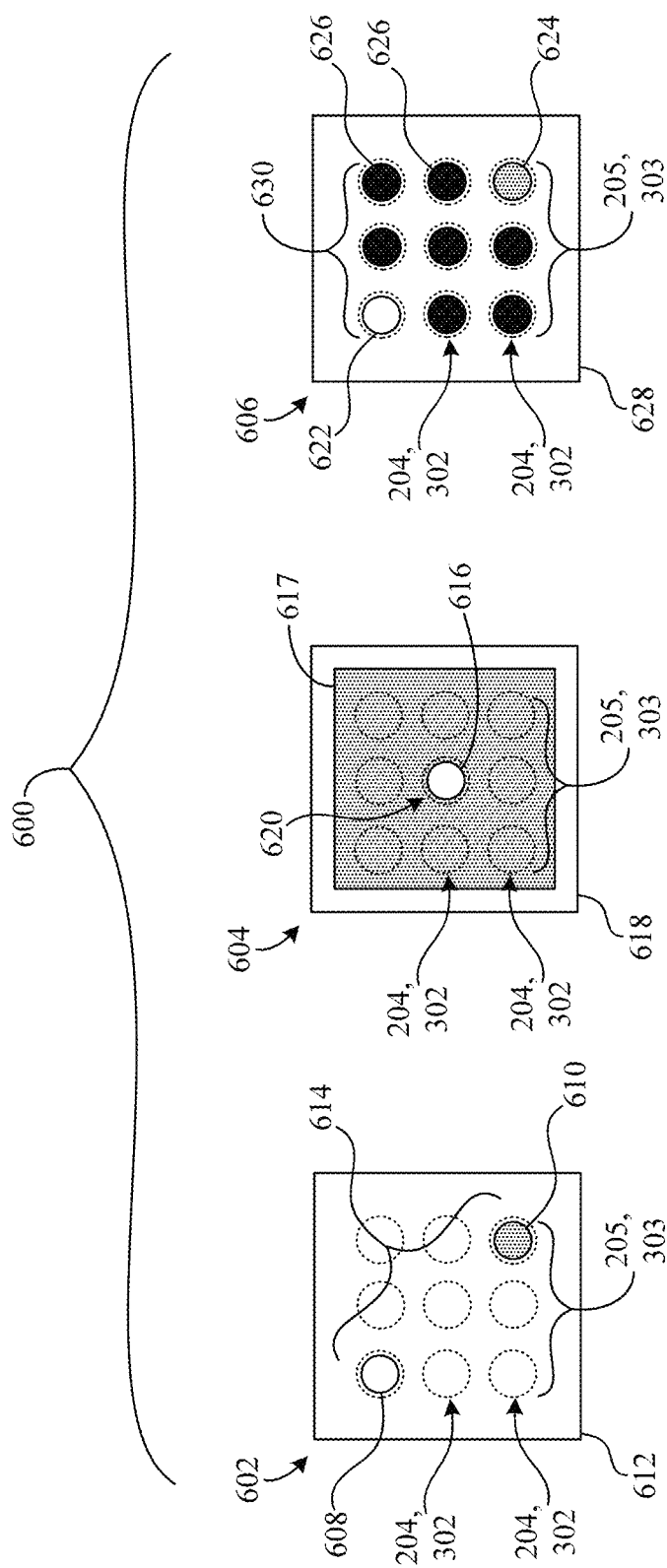
FIGS. 6-8 are schematic illustrations of example sensors suites in accordance with the teachings of this disclosure.

FIG. 6 is a schematic illustration of a first example sensor suite 600 in accordance with the teachings of this disclosure. According to the illustrated example of FIG. 2, the first sensor suite 600 includes three of the electronic component(s) 110 of FIG. 1 such as, for example, a second electronic component 602, a third electronic component 604, and fourth electronic component 606. In particular, each of the electronic components 602, 604, 606 of FIG. 6 is a unique type of electronic component. In some such examples, each of the electronic components 602, 604, 606 of FIG. 6 has a unique connector configuration or pattern associated therewith that is identifiable and/or detectable by the controller 112 when the first sensor suit 600 is operatively coupled to the vehicle 100 via at least one of the mounting feature(s) 104, 106, 108. At least one of the mounting feature(s) 104, 106, 108 of the connection system 102 is sized, shaped, structured, and/or otherwise configured to receive all of the second electronic component 602, the third electronic component 604, and the fourth electronic component 606 (i.e., the entire first sensor suite 600 of FIG. 6). Alternatively, in some examples, the electronic components 602, 604, 606 of the first sensor suite 600 can be distributed among two or more of the mounting features 104, 106, 108.

According to the illustrated example of FIG. 6, the second electronic component 602 includes a power connector 608 and a ground connector 610 (i.e., two primary connectors) that are positioned on a body 612 of the second electronic component 602. The power connector 608 is spaced from the ground connector 610 by a distance. In particular, each of the power and ground connectors 608, 610 of the second electronic component 602 is insertable in one of the apertures 204, 302 (as represented by the dotted/dashed lines of FIG. 6) associated with the mounting feature(s) 104, 106, 108, for example, to directly contact a corresponding one of the secondary connectors 210. As shown in FIG. 6, the connectors 608, 610 of the second electronic component 602 form and/or define a second example connector configuration or pattern 614 associated with the second electronic component 602. In such examples, the second connector pattern 614 matches at least a portion of the first aperture pattern 205 and/or the second aperture pattern 303, which facilitates insertion of the power and ground connectors 608, 610 in the apertures 204, 302. For example, the distance between the power and ground connectors 608, 610 is substantially equal to or the same as (a) a distance between at least two of the apertures 204 of the first mounting feature 104 and/or (b) a distance between at least two of the apertures 302 of the second mounting feature 106. Additionally, the second connector pattern 614 can indicate to the controller 112 a type of the second electronic component 602.

According to the illustrated example of FIG. 6, the third electronic component 604 includes a power connector 616 (i.e., a single primary connector), which is centrally positioned on a body 618 the third electronic component 604. In particular, the power connector 616 of the third electronic component 604 is insertable in one of the apertures 204, 302 associated with the mounting feature(s) 104, 106, 108, for example, to directly contact a corresponding one of the secondary connectors 210. As shown in FIG. 6, the power connector 616 of the third electronic component 604 forms and/or defines a third connector configuration or pattern 620 associated with the third electronic component 604, which can indicate to the controller 112 a type of the third electronic component 604. Additionally, the third electronic component 604 of FIG. 6 also includes a grounding feature 617, instead of a grounding pin, that is associated with grounding the third electronic component 604. The grounding feature 617 covers a substantially large area of the body 618 of the third electronic component 604 compared to the single power connector 616. In such examples, the grounding feature 617 is configured to directly contact a substrate 202 of a mounting feature 104, 106, 108, thereby grounding the third electronic component 604.

According to the illustrated example of FIG. 6, the fourth electronic component 606 includes a power connector 622, a ground connector 624, and multiple (e.g., seven) data connectors 626 that are distributed on a body 628 of the fourth electronic component 606. In particular, each of the power connector 622, the ground connector 624, and the data connectors 626 is insertable in one of the apertures 204, 302 associated with the mounting feature(s) 104, 106, 108, for example, to contact a corresponding one of the secondary connectors 210. As shown in FIG. 6, the connectors 622, 624, 626 of the fourth electronic component 606 form and/or define a fourth connector configuration or pattern 630 associated with the fourth electronic component 606, which can indicate to the controller 112 a type of the fourth electronic component 606. In such examples, the fourth connector pattern 630 matches at least a portion of the first aperture pattern 205 and/or the second aperture pattern 303, which facilitates insertion of the connectors 622, 624, 626 in the apertures 204, 302. As shown, spacing associated with the connectors 622, 624, 626 of the fourth electronic component 606 substantially matches the spacing associated with the apertures 204, 302. For example, the connectors 622, 624, 626 of the fourth electronic component 606 are evenly spaced from each other.

Figure 7:
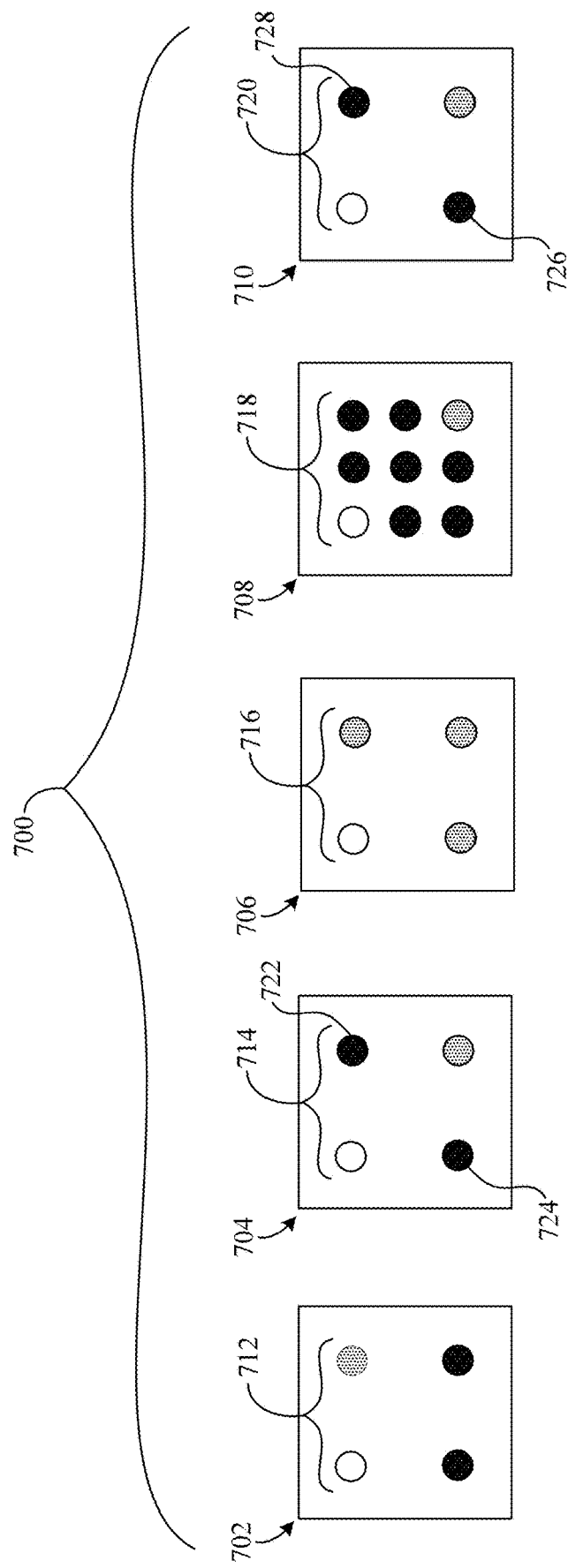

FIG. 7 is a schematic illustration of a second example sensor suite 700 in accordance with the teachings of this disclosure. According to the illustrated example of FIG. 7, the second sensor suite 700 includes five of the electronic component(s) 110 of FIG. 1 such as, for example, a fifth electronic component (e.g., a camera) 702, a sixth electronic component (e.g., a radar sensor) 704, a seventh electronic component (e.g., a light) 706, an eighth electronic component (e.g., an ECU) 708, and a ninth electronic component (e.g., a sonar sensor) 710. Similar to the first sensor suite 600 of FIG. 6, each of the electronic components 702, 704, 706, 708, 710 of FIG. 7 has a unique connector configuration or pattern associated therewith that is identifiable and/or detectable by the controller 112 when the second sensor suite 700 is operatively coupled to the vehicle 100 via at least one of the mounting feature(s) 104, 106, 108. At least one of the mounting feature(s) 104, 106, 108 of the connection system 102 is sized, shaped, structured, and/or otherwise configured to receive all of the fifth electronic component 702, the sixth electronic component 704, the seventh electronic component 706, the eighth electronic component 708, and the ninth electronic component 710 (i.e., the entire second sensor suite 700 of FIG. 7). Alternatively, in some examples, the electronic components 702, 704, 706, 708, 710 of the second sensor suite 700 can be distributed among two or more of the mounting features 104, 106, 108.

In some examples, the controller 112 is configured to detect a fifth connector configuration or pattern (e.g., formed by a power connector, a ground connector, and two data connectors) 712 associated with the fifth electronic component 702 when the fifth electronic component 702 is connected to one of the mounting feature(s) 104, 106, 108. In such examples, the controller 112 determines that the fifth electronic component 702 is a first camera based on the fifth connector pattern 712.

Additionally, in some examples, the controller 112 is configured to detect a sixth connector configuration or pattern (e.g., formed by a power connector, a ground connector, and two data connectors) 714 associated with the sixth electronic component 704 when the sixth electronic component 704 is connected to one of the mounting feature(s) 104, 106, 108. In such examples, the controller 112 determines that the sixth electronic component 704 is a radar sensor based on the sixth connector pattern 714.

Additionally, in some examples, the controller 112 is configured to detect a seventh connector configuration or pattern (e.g., formed by one power connector and three ground connectors) 716 associated with the seventh electronic component 706 when the seventh electronic component 706 is connected to one of the mounting feature(s) 104, 106, 108. In such examples, the controller 112 determines that the seventh electronic component 706 is a first light based on the seventh connector pattern 716.

Additionally, in some examples, the controller 112 is configured to detect an eighth connector configuration or pattern (e.g., formed by one power connector, one ground connector, and seven data connectors) 718 associated with the eighth electronic component 708 when the eighth electronic component 708 is connected to one of the mounting feature(s) 104, 106, 108. In such examples, the controller 112 determines that the eighth electronic component 708 is an ECU (e.g., an autonomous control module) based on the eighth connector pattern 718.

Additionally, in some examples, the controller 112 is configured to detect a ninth connector configuration or pattern (e.g., formed by one power connector, one ground connector, and two data connectors) 720 associated with the ninth electronic component 710 when the ninth electronic component 710 is connected to one of the mounting feature(s) 104, 106, 108. In such examples, the controller 112 determines that the ninth electronic component 710 is a sonar sensor based on the ninth connector pattern 720.

As shown in FIG. 7, the sixth connector pattern 714 is similar to the ninth connector pattern 720. However, in some examples, the controller 112 is configured to distinguish between the sixth and ninth connector patterns 714, 720 based on unique positional parameters associates with data connectors of the respective sixth and ninth electronic components 704, 710. For example, the sixth electronic component 704 includes a primary data connector 722 and an auxiliary data connector 724 different from the primary data connector 722. Further, the ninth electronic component 710 includes a primary data connector 726 and an auxiliary data connector 728 different from the primary data connector 726. In particular, the primary and auxiliary data connectors 722, 724 of the sixth electronic component 704 are positioned relative to the sixth electronic component 704 in a different manner compared to the primary and auxiliary data connectors 726, 728 of the ninth electronic component 710.

Figure 8:
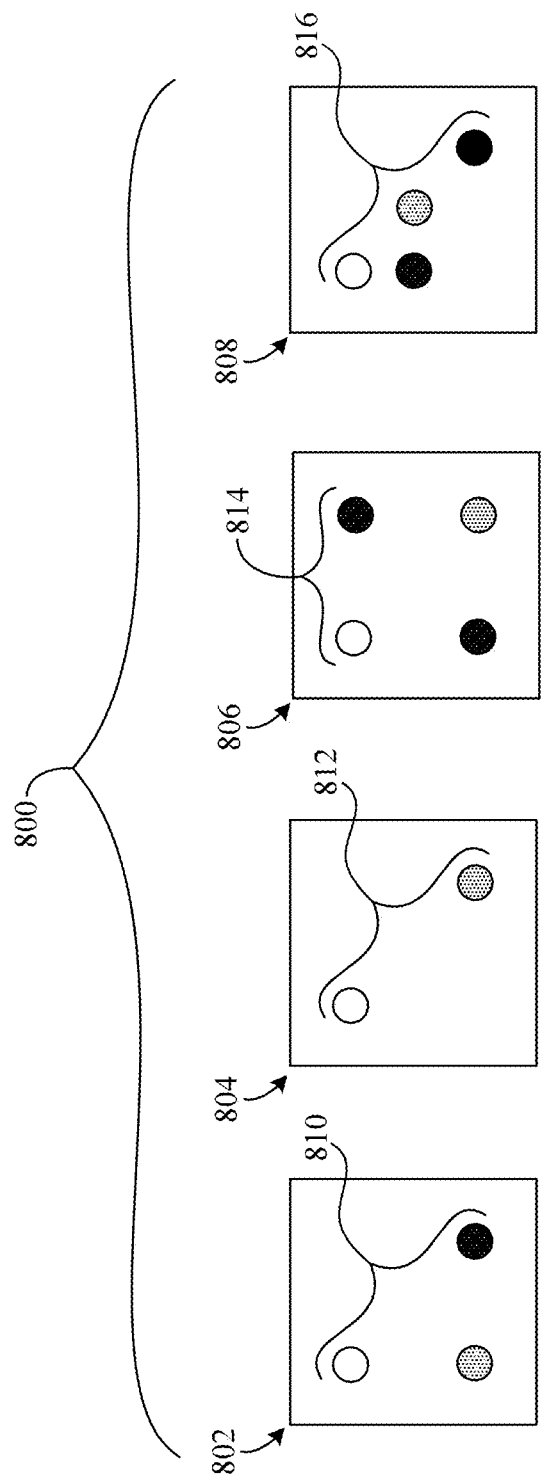

FIG. 8 is a schematic illustration of a third example sensor suite 800 in accordance with the teachings of this disclosure. According to the illustrated example of FIG. 8, the third sensor suite 800 includes four of the electronic component(s) 110 of FIG. 1 such as, for example, a tenth electronic component (e.g., a camera) 802, an eleventh electronic component (e.g., a light) 804, a twelfth electronic component (e.g., a camera) 806, and a thirteenth electronic component (e.g., a LiDAR sensor) 808. Similar to the first and second sensor suites 600, 700 of FIGS. 6 and 7, each of the electronic components 802, 804, 806, 808 of FIG. 8 has a unique connector configuration or pattern associated therewith that is identifiable and/or detectable by the controller 112 when the third sensor suite 800 is operatively coupled to the vehicle 100 via at least one of the mounting feature(s) 104, 106, 108. At least one of the mounting feature(s) 104, 106, 108 is sized, shaped, structured, and/or otherwise configured to receive all of the tenth electronic component 802, the eleventh electronic component 804, the twelfth electronic component 806, and the thirteenth electronic component 808 (i.e., the entire third sensor suite 800 of FIG. 8). Alternatively, in some examples, the electronic components 802, 804, 806, 808 of the third sensor suite 800 can be distributed among two or more of the mounting features 104, 106, 108.

In some examples, the controller 112 is configured to detect a tenth connector configuration or pattern (e.g., formed by a power connector, a ground connector, and a data connector) 810 associated with the tenth electronic component 802 when the tenth electronic component 802 is connected to one of the mounting feature(s) 104, 106, 108. In such examples, the controller 112 determines that the tenth electronic component 802 is a second camera, different from the first camera, based on the tenth connector pattern 810.

Additionally, in some examples, the controller 112 is configured to detect an eleventh connector configuration or pattern (e.g., formed by a power connector and a ground connector) 812 associated with the eleventh electronic component 804 when the eleventh electronic component 804 is connected to one of the mounting feature(s) 104, 106, 108. In such examples, the controller 112 determines that the eleventh electronic component 804 is a second light, different from the first light, based on the eleventh connector pattern 812.

Additionally, in some examples, the controller 112 is configured to detect a twelfth connector configuration or pattern (e.g., formed by a power connector, a ground connector, and two data connectors) 814 associated with the twelfth electronic component 806 when the twelfth electronic component 806 is connected to one of the mounting feature(s) 104, 106, 108. In such examples, the controller 112 determines that the twelfth electronic component 806 is a third camera, different from the first and second cameras, based on the twelfth connector pattern 814.

Additionally, in some examples, the controller 112 is configured to detect a thirteenth connector configuration or pattern (e.g., formed by a power connector, a ground connector, and two data connectors) 816 associated with the thirteenth electronic component 808 when the thirteenth electronic component 808 is connected to one of the mounting feature(s) 104, 106, 108. In such examples, the controller 112 determines that the thirteenth electronic component 808 is a LiDAR sensor based on the thirteenth connector pattern 816.

Figure 9:
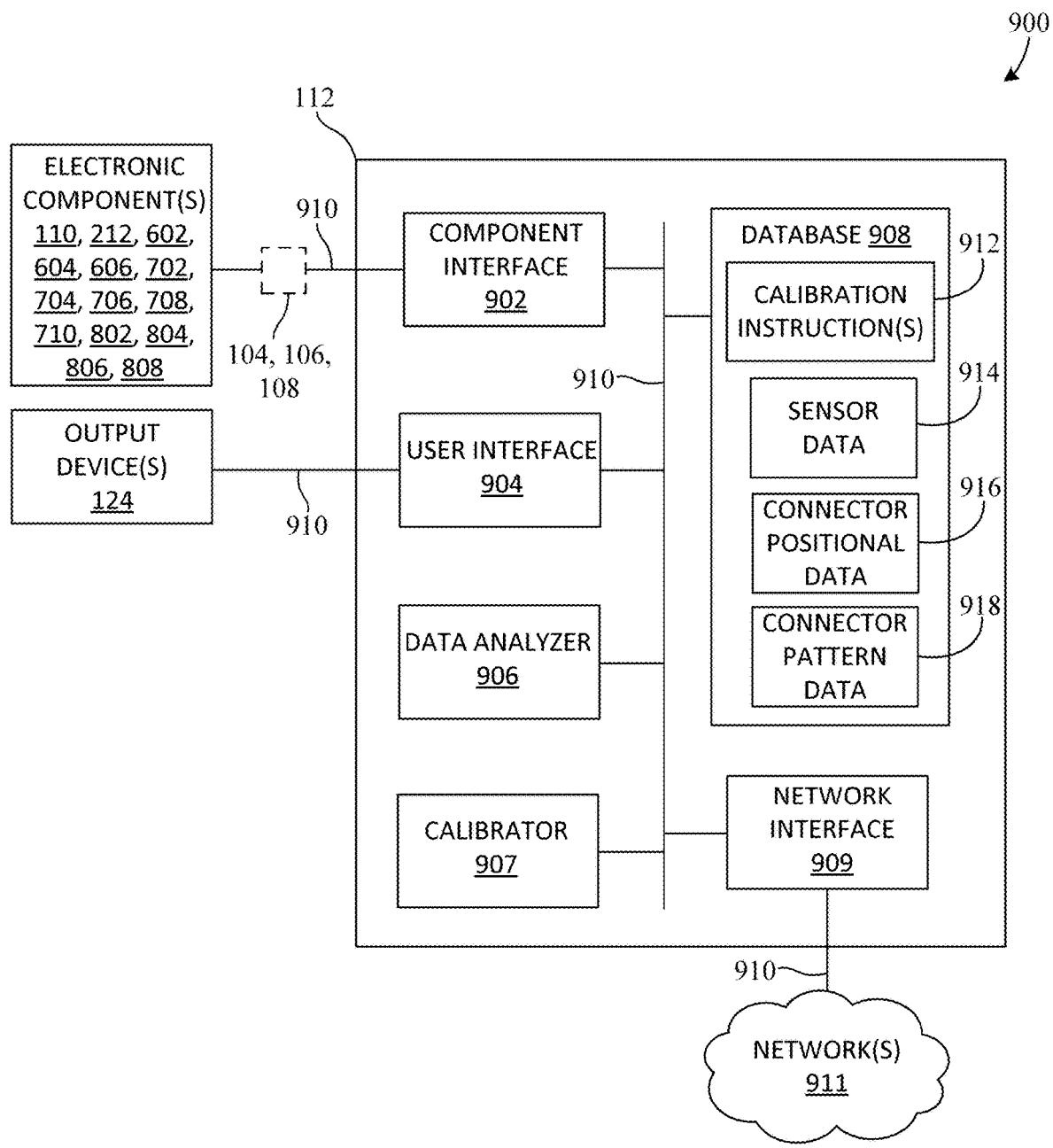
FIG. 9 is a block diagram of an example configuration system in accordance with the teachings of this disclosure.

FIG. 9 is a block diagram of an example configuration system 900 in accordance with the teachings of this disclosure. In some examples, the configuration system 900 of FIG. 9 is implemented by the controller 112 of FIG. 1. Additionally or alternatively, in some examples, the configuration system 900 of FIG. 9 is implemented by vehicle 100 of FIGS. 1 and 3-5 and/or at least one of the electronic component(s) 110 of FIG. 1. According to the illustrated example of FIG. 9, the configuration system 900 includes an example component interface 902, an example user interface 904, an example data analyzer 906, an example calibrator 907, an example database 908, and an example network interface 909. The configuration system 900 of FIG. 9 is communicatively coupled to one or more (e.g., all) of the aforementioned electronic components 110, 212, 602, 604, 606, 702, 704, 706, 708, 710, 802, 804, 806, 808 via one or more example communication links 910 such as, for example, a signal or transmission wire, a bus (e.g., a CAN bus), radio frequency, etc. that forms at least part of the wiring system 114. Additionally, in some examples, the configuration system 900 of FIG. 9 is communicatively coupled to the output device(s) 124 and/or one or more example networks 911 via the link(s) 910. In particular, the configuration system 900 of FIG. 9 is structured to detect one or more of the electronic components 110, 212, 602, 604, 606, 702, 704, 706, 708, 710, 802, 804, 806, 808 when the electronic component(s) 110, 212, 602, 604, 606, 702, 704, 706, 708, 710, 802, 804, 806, 808 is/are connected to the mounting feature(s) 104, 106, 108. Further, in some examples, the configuration system 900 is structured to configure the electronic component(s) 110, 212, 602, 604, 606, 702, 704, 706, 708, 710, 802, 804, 806, 808 for operation in response to such detection, as discussed in greater detail below.

The component interface 902 of FIG. 9 facilitates communications and/or interactions between the configuration system 900 and at least one of the electronic components 110, 212, 602, 604, 606, 702, 704, 706, 708, 710, 802, 804, 806, 808. The component interface 902 of FIG. 9 is communicatively coupled, via the link(s) 910, to one or more (e.g., all) of the electronic components 110, 212, 602, 604, 606, 702, 704, 706, 708, 710, 802, 804, 806, 808 to receive data therefrom and/or provide data thereto, for example, when the electronic component(s) 110, 212, 602, 604, 606, 702, 704, 706, 708, 710, 802, 804, 806, 808 is/are connected to the mounting feature(s) 104, 106, 108. In some examples, the component interface 902 receives or obtains one or more example calibration instructions 912 from the electronic component(s) 110, 212, 602, 604, 606, 702, 704, 706, 708, 710, 802, 804, 806, 808, which facilitates calibrating associated sensors modules. As will be discussed below, the configuration system 900 calibrates the electronic component(s) 110, 212, 602, 604, 606, 702, 704, 706, 708, 710, 802, 804, 806, 808 in accordance with the calibration instruction(s) 912. Additionally, in some such examples, the component interface 902 receives example sensor data 914 from one or more of the electronic component(s) 110, 212, 602, 604, 606, 702, 704, 706, 708, 710, 802, 804, 806, 808, for example, during one or more calibration operations initiated by the configuration system 900.

The user interface 904 facilitates communications and/or interactions between the configuration system 900 and the user(s). The user interface 904 includes, for example, a human-machine interface (HMI) and/or a graphical user interface (GUI). The user interface 904 of FIG. 9 is communicatively coupled, via the link(s) 910, to the output device(s) 124 to provide one or more control signals or commands and/or electrical power thereto. For example, the user interface 904 directs the output device(s) 124 to generate visual data (a pop-up message or window, text or characters, symbols, etc.) and/or audible data (e.g., sounds such as a chime, speech, etc.).

The data analyzer 906 of FIG. 9 is configured to identify one or more of the electronic components 110, 212, 602, 604, 606, 702, 704, 706, 708, 710, 802, 804, 806, 808. In some examples, the data analyzer 906 receives and/or detects identification (ID) data associated with each electronic component 110, 212, 602, 604, 606, 702, 704, 706, 708, 710, 802, 804, 806, 808 such as, for example, one or more of a serial number, an ID number, etc. Additionally or alternatively, in some examples, the data analyzer 906 identifies the electronic component(s) 110, 212, 602, 604, 606, 702, 704, 706, 708, 710, 802, 804, 806, 808 based on the associated connector pattern(s) 220, 614, 620, 630, 712, 714, 716, 718, 720, 810, 812, 814, 816. For example, the data analyzer 906 determines that: (a) the fifth electronic component 702 of FIG. 7 is the first camera in response to detecting the fifth connector pattern 712; (b) the sixth electronic component 704 of FIG. 7 is the radar sensor in response to detecting the sixth connector pattern 714; (c) the seventh electronic component 706 of FIG. 7 is the first light in response to detecting the seventh connector pattern 716; (d) the eighth electronic component 708 of FIG. 7 is the ECU in response to detecting the eighth connector pattern 718; (e) the ninth electronic component 710 of FIG. 7 is the sonar sensor in response to detecting the ninth connector pattern 720; (f) the tenth electronic component 802 of FIG. 8 is the second camera in response to detecting the tenth connector pattern 810; (g) the eleventh electronic component 804 of FIG. 8 is the second light in response to detecting the eleventh connector pattern 812; (h) the twelfth electronic component 806 of FIG. 8 is the third camera in response to detecting the twelfth connector pattern 814; and/or (i) the thirteenth electronic component 808 of FIG. 8 is the LiDAR sensor in response to detecting the thirteenth connector pattern 816.

To detect such a connector pattern of interest, the data analyzer 906 of FIG. 9 is configured to determine which ones of the secondary connectors 210 are mated with the primary connectors 214. That is, each of secondary connectors 210 of the connection system 102 is identifiable and/or detectable by the data analyzer 906 when the secondary connectors 210 directly contact the primary connectors 214 to form electrical connections between the electronic component(s) 110, 212, 602, 604, 606, 702, 704, 706, 708, 710, 802, 804, 806, 808 and the wiring system 114. In such examples, the data analyzer 906 is configured to determine a type of each primary connector 214 based on the electrical connections such as, for example, one of a power connector, a ground connector, or a data connector. Additionally or alternatively, in some examples, the data analyzer 906 is configured to determine positions of the primary connectors 214 relative to each other, for example, based on example connector positional data 916 (e.g., predetermined data stored in the database 908 that is associated with the secondary connectors 210). In such examples, the connector positional data 916 of FIG. 9 includes data corresponding to predetermined locations of the secondary connectors 210 relative to the vehicle 100. Thus, by determining which ones of the of the secondary connectors 210 are mated with the primary connectors 214, the data analyzer 906 advantageously utilizes the connector positional data 918 to accurately determine the positions of the primary connectors 214 relative to each other.

As previously mentioned, the positions and/or types of the primary connectors 214 provide a connector pattern of interest (e.g., one of the connector patterns 220, 614, 620, 630, 712, 714, 716, 718, 720, 810, 812, 814, 816 of FIGS. 2 and 6-8) indicative of a type of electronic component. In some examples, the data analyzer 906 compares a detected connector pattern 220, 614, 620, 630, 712, 714, 716, 718, 720, 810, 812, 814, 816 to example connector pattern data 918, thereby determining the type of the electronic component. In such examples, the connector pattern data 918 of FIG. 9 includes data corresponding to predetermined connector patterns, each of which is associated with, for example, one of a particular sensor module, a particular ECU, a particular light, a particular battery, etc. As such, if the data analyzer 906 determines that the detected connector pattern 220, 614, 620, 630, 712, 714, 716, 718, 720, 810, 812, 814, 816 matches one of the predetermined connector patterns in the connector pattern data 918, the data analyzer 906 accurately determines that an electronic component 110, 212, 602, 604, 606, 702, 704, 706, 708, 710, 802, 804, 806, 808 includes, for example, one of the sensor module, the ECU, the light, the battery, etc.

The calibrator 907 of FIG. 9 is configured to calibrate one or more of the electronic components 110, 212, 602, 604, 606, 702, 704, 706, 708, 710, 802, 804, 806, 808 when the electronic component(s) 110, 212, 602, 604, 606, 702, 704, 706, 708, 710, 802, 804, 806, 808 is/are connected to the mounting feature(s) 104, 106, 108. In some examples, the calibrator 907 is configured to use at least a portion of the sensor data 914 to calibrate the electronic component(s) 110, 212, 602, 604, 606, 702, 704, 706, 708, 710, 802, 804, 806, 808. Additionally or alternatively, in some examples, the calibrator 907 is configured to use at least a portion of the connector positional data 918 to calibrate the electronic component(s) 110, 212, 602, 604, 606, 702, 704, 706, 708, 710, 802, 804, 806, 808. In such examples, similar to the data analyzer 906, the calibrator 907 of FIG. 9 is configured to determine which ones of the secondary connectors 210 are mated with the primary connectors 214. In such examples, by determining which ones of the of the secondary connectors 210 are mated with the primary connectors 214, the calibrator 907 advantageously utilizes the connector positional data 918 to accurately determine a relative location and/or orientation of a particular electronic component 110, 212, 602, 604, 606, 702, 704, 706, 708, 710, 802, 804, 806, 808. Then, the calibrator 907 calibrates that electronic component 110, 212, 602, 604, 606, 702, 704, 706, 708, 710, 802, 804, 806, 808 based on the relative location and/or orientation.

Additionally, or alternatively, in some examples, the calibrator 907 enables self-calibration of the electronic component(s) 110, 212, 602, 604, 606, 702, 704, 706, 708, 710, 802, 804, 806, 808. For example, the calibrator 907 transmits the relative location, the relative orientation, and/or the connector positional data 916 to the electronic component(s) 110, 212, 602, 604, 606, 702, 704, 706, 708, 710, 802, 804, 806, 808.

The database 908 of FIG. 9 stores data (e.g., at least some or all of the calibration instruction(s) 912, the sensor data 914, the connector positional data 916, the connector pattern data 918, etc.) and/or provides access to at least a portion of the data therein. In particular, the database 908 is communicatively coupled, via the link(s) 910, to the component interface 902, the user interface 904, the data analyzer 906, and the calibrator 907. For example, the database 908 receives (e.g., repeatedly or continuously) data from the component interface 902, the user interface 904, the data analyzer 906, and/or the calibrator 907. Conversely, the database 908 provides (e.g., repeatedly or continuously) data to the component interface 902, the user interface 904, the data analyzer 906, and/or the calibrator 907.

The network interface 909 of FIG. 9 facilitates communications and/or interactions between the configuration system 900 and one or more systems and/or devices external to the configuration system 900. The network interface 909 is communicatively coupled to the network(s) 911 via the link(s) 910 to receive data from the network(s) 911 and/or provide data to the network(s) 911. In some examples, the network(s) 911 of FIG. 9 form part of a vehicle communication system associated with the vehicle 100 such as, for example, one of a vehicle-to-vehicle (V2V) communication system, a vehicle-to-everything (V2X) communication system, a cloud communication system, etc. For example, the network interface 909 communicates, via the network(s) 911, with one or more different vehicles and/or a server (e.g., a cloud server). In this manner, the vehicle 100 and the different vehicle(s) can share data of interest with each other and/or upload the data to the server. In some examples, the vehicle 100 and the different vehicle(s) share example configuration data (e.g., a configuration of particular one(s) of the electronic component(s) 110, 212, 602, 604, 606, 702, 704, 706, 708, 710, 802, 804, 806, 808 found by the system 900), sensor contents, etc. In another example, vehicle 100 and the different vehicle(s) share one or more sensor positions each time such data of interest is sent to the server. Although the example configuration system 900 is illustrated in FIG. 9, one or more of the elements, processes, and/or devices depicted in FIG. 9 may be combined, divided, re-arranged, omitted, eliminated, and/or implemented in any other way. Further, the example configuration system 900 of FIG. 9 may include one or more elements, processes, and/or devices in addition or alternatively to those illustrated in FIG. 9, and/or may include more than one of any or all of the illustrated elements, processes, and devices.

Additionally, one or more of the example component interface 902, the example user interface 904, the example data analyzer 906, the example calibrator 907, the example database 908, the example network interface 909, and/or, more generally, the example configuration system 900 of FIG. 9 may be implemented by hardware, software, firmware and/or any combination of thereof. For example, any of the example component interface 902, the example user interface 904, the example data analyzer 906, the example calibrator 907, the example database 908, the example network interface 909, and/or, more generally, the example configuration system 900 could be implemented by one or more circuits (e.g., an analog or digital circuit, a logic circuit, a programmable processor, etc.). Further, in some examples, at least one of the example component interface 902, the example user interface 904, the example data analyzer 906, the example calibrator 907, the example database 908, the example network interface 909, and/or the example configuration system 900 include(s) a tangible machine-readable storage device or storage disk (e.g., a memory storing the software and/or firmware).

Figure 11:
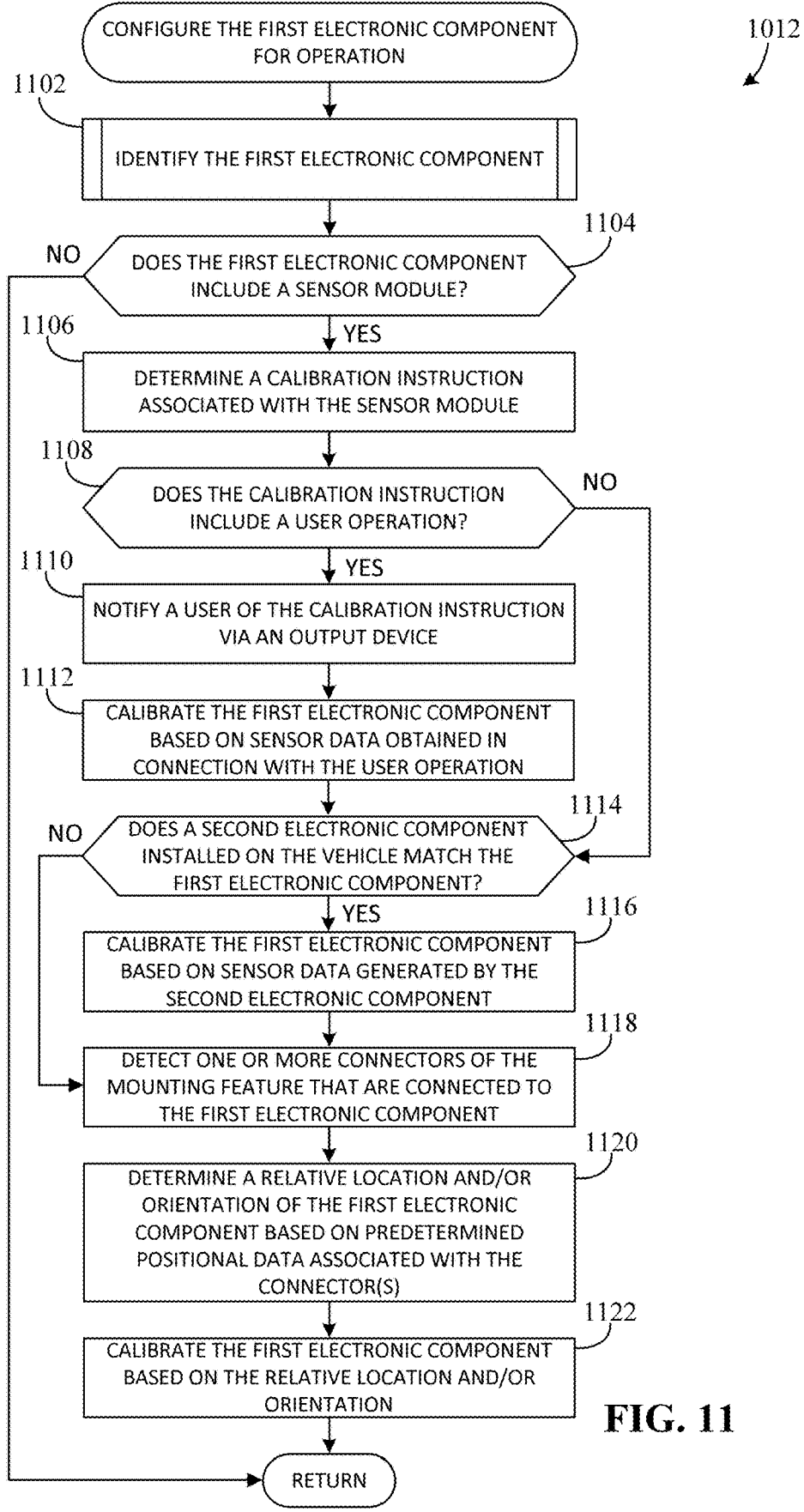
FIG. 11 is a flowchart representative of an example method that can be executed to implement the example configuration system of FIG. 9 to configure an electronic component for operation.
Figure 12:
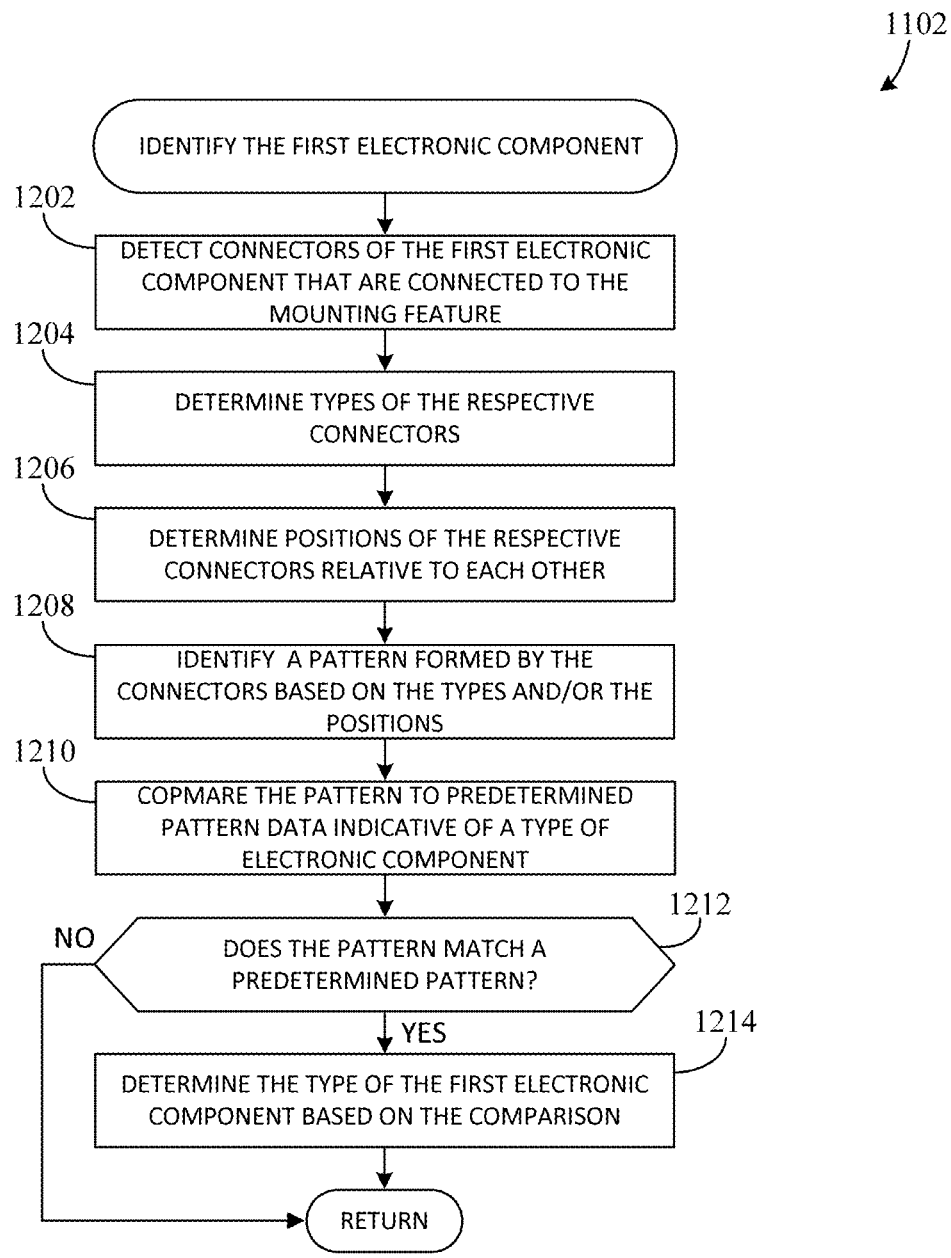
FIG. 12 is a flowchart representative of an example method that can be executed to implement the example configuration system of FIG. 9 to identify an electronic component operatively coupled to a vehicle.

Flowcharts representative of example hardware logic or machine-readable instructions for implementing the example configuration system 900 of FIG. 9 are shown in FIGS. 11 and 12. The machine-readable instructions may be a program or portion of a program for execution by a processor (e.g., the CPU 1302 of FIG. 13), which is discussed in greater detail below in connection with FIG. 13. The program may be embodied in software stored on a tangible machine-readable storage medium such as a CD-ROM, a floppy disk, a hard drive, or a memory associated with the processor. Alternatively, the entire program and/or parts thereof could be executed by a different device and/or embodied in firmware or dedicated hardware.

The example processes of FIGS. 11 and 12 may be implemented using executable or coded instructions (e.g. computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example methods of FIGS. 11 and 12 may be implemented using coded instructions stored on a non-transitory machine-readable medium in which information is stored for any duration, which includes any type of computer or machine readable storage device or disk and excludes propagating signals and transmission media.

As used herein, the terms "Including" and "comprising" (and all forms and tenses thereof) are to be open ended terms. Thus, whenever a claim employs any form of "include" or "comprise" (e.g., comprises, includes, comprising, including, has, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended.

Figure 10:
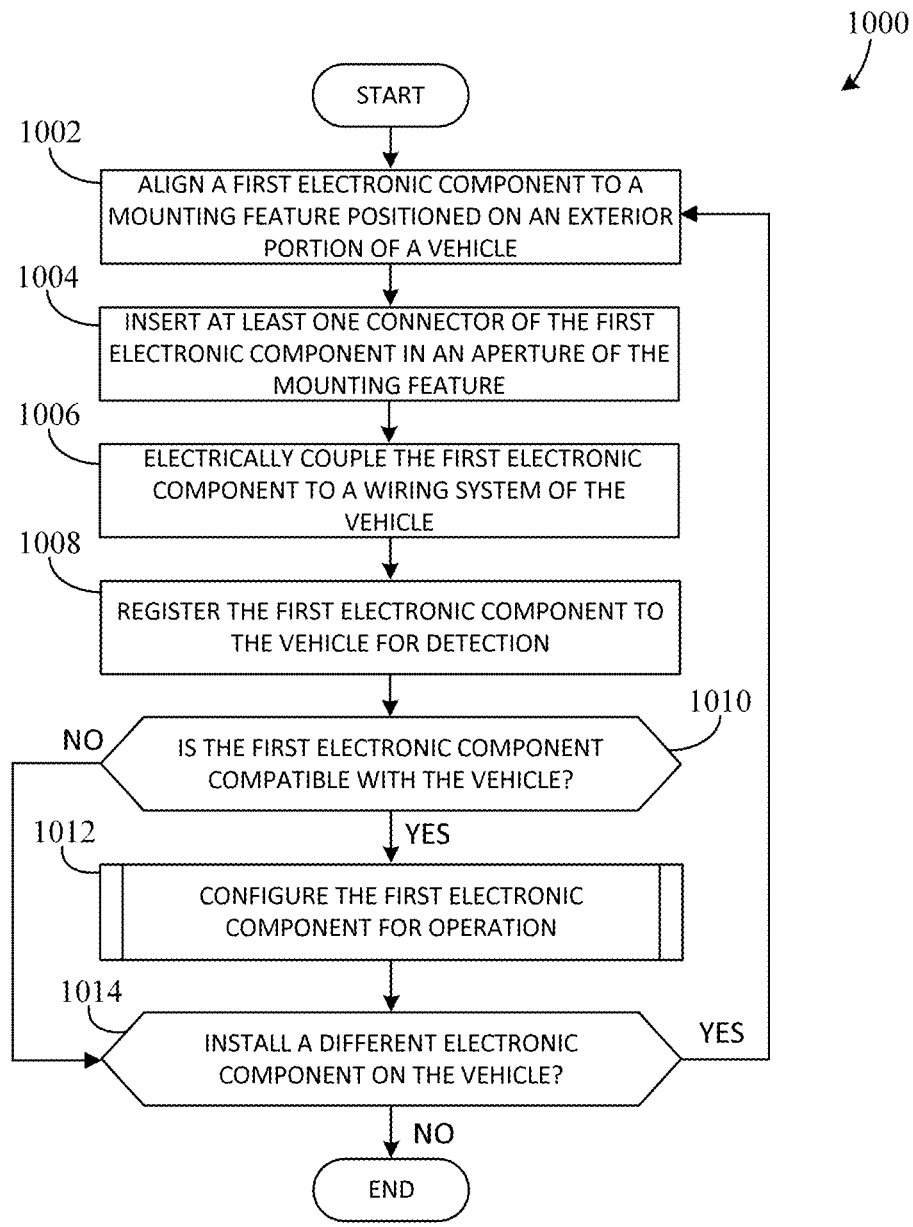
FIG. 10 is a flowchart representative of an example method that can be executed to install one or more electronic components on a vehicle.

FIG. 10 is a flowchart representative of an example method 1000 that can be executed to install one or more electronic components on a vehicle. The example method 1000 of FIG. 10 can be implemented in the vehicle 100 of FIGS. 1 and 3-5 and/or the connection system 102 of FIGS. 1, 2, 4 and 5. In particular, the example method 1000 of FIG. 10 is effective in installing one or more of the aforementioned electronic components 110, 212, 602, 604, 606, 702, 704, 706, 708, 710, 802, 804, 806, 808 on the vehicle 100.

The example method 1000 of FIG. 10 begins by aligning a first electronic component to a mounting feature positioned on an external portion of a vehicle (block 1002). In some examples, the first electronic component 212 of FIGS. 2, 4, 5, and 9 is aligned to one of the mounting feature(s) 104, 106, 108. For example, the first electronic component 212 is positioned and/or oriented relative to the first mounting feature 104 such that at least one primary connector 214 of the first electronic component 212 aligns to an aperture 204 of the first mounting feature 104. Similarly, in another example, the first electronic component 212 is positioned and/or oriented relative to the second mounting feature 106 such that at least one primary connector 214 of the first electronic component 212 aligns to an aperture 302 of the second mounting feature 106. Additionally, in examples where the first electronic component 212 is implemented using multiple primary connectors 214, each of the multiple primary connectors 214 of the first electronic component 212 aligns to one of the multiple apertures 204 of the first mounting feature 104 or one of the multiple apertures 302 of the second mounting feature 106.

The example method 1000 of FIG. 10 also includes inserting at least one connector of the first electronic component in an aperture of the mounting feature (block 1004). In some examples, at least one primary connector 214 of the first electronic component 212 is inserted in an aperture 204 of the first mounting feature 104 or an aperture 302 of the second mounting feature 106. Additionally, in examples where the first electronic component 212 is implemented using multiple primary connectors 214, each of the multiple primary connectors 214 of the first electronic component 212 is inserted in one of the multiple apertures 204 of the first mounting feature 104 or one of the multiple apertures 302 of the second mounting feature 106. Additionally, in such examples, the first electronic component 212 couples (e.g., removably couples) to the first mounting feature 104 and/or the second mounting feature 106 as a result of such insertion.

The example method 1000 of FIG. 10 also includes electrically coupling the first electronic component to a wiring system of the vehicle (block 1006). In some examples, the first electronic component 212 of FIG. 2 electrically couples to the wiring system 114 of the vehicle 100 in response to at least one primary connector 214 directly contacting a secondary connector 210. As previously mentioned, the first mounting feature 104 and/or the second mounting feature 106 electrically couple the first electronic component 212 to the wiring system 114 of the vehicle 100 in response to such insertion of at least one primary connector 214 in an aperture 204, 302.

The example method 1000 of FIG. 10 also includes registering the first electronic component to the vehicle for detection (block 1008). In some examples, the configuration system 900 of FIG. 9 registers (e.g., via the component interface 902 and/or the data analyzer 906) the first electronic component 212 to the vehicle 100 for detection.

The example method 1000 of FIG. 10 also includes determining whether the first electronic component compatible with the vehicle (block 1010). In some examples, the configuration system 900 of FIG. 9 determines (e.g., via the data analyzer 906) whether the first electronic component 212 is compatible with the vehicle 100, for example, based on a type of language associated with the first electronic component 212. If the configuration system 900 provides a positive determination (block 1010: YES), control of the example method 1000 of FIG. 10 proceeds to block 1012. On the other hand, if the configuration system 900 provides a negative determination (block 1010: NO), control of the example method 1000 of FIG. 10 proceeds to block 1014.

The example method 1000 of FIG. 10 also includes configuring the first electronic component for operation (block 1012). In some examples, the configuration system 900 of FIG. 9 configures (e.g., via the component interface 902, the data analyzer 906, and/or the calibrator 907) the first electronic component 212 for operation, as discussed in further detail below in connection with FIGS. 11 and 12. In such examples, configuring the first electronic component 212 in accordance with the example methods of FIGS. 11 and 12 enables functionality and/or calibration of the first electronic component 212 when the vehicle 100 is in operation.

The example method 1000 of FIG. 10 also includes determining whether to install a different electronic component on the vehicle (block 1014). In some examples, if a user determines to the install one of the other electronic components 110, 602, 604, 606, 702, 704, 706, 708, 710, 802, 804, 806, 808 on the vehicle 100 (block 1014: YES), control of the example method 1000 of FIG. 10 returns to block 1002. On the other hand, if the user determines not to install one of the other electronic components 110, 602, 604, 606, 702, 704, 706, 708, 710, 802, 804, 806, 808 on the vehicle 100 (block 1014: NO), the example method 1000 of FIG. 10 ends.

Although the example method 1000 is described in connection with the flowchart of FIG. 10, other methods of installing such electronic component(s) on a vehicle may alternatively be used. For example, the order of execution of the blocks 1002, 1004, 1006, 1008, 1010, 1012, 1014 may be changed, and/or some of the blocks 1002, 1004, 1006, 1008, 1010, 1012, 1014 described may be changed, eliminated, or combined. In some examples, multiple electronic components are installed on the vehicle 100 (e.g., simultaneously), instead of a single electronic component. In such examples, the first sensor suite 600, the second sensor suite 700, and/or the third sensor suite 800 may be installed on the vehicle 100 in a similar manner via at least one of the mounting feature(s) 104, 106, 108 of the connection system 102.

FIG. 11 is a flowchart representative of an example method 1012 that can be executed to implement the example configuration system 900 of FIG. 9 to configure an electronic component for operation. The example method 1012 of FIG. 11 can be implemented in any of the vehicle 100 of FIGS. 1 and 3-5, the connection system 102 of FIGS. 1, 2, 4, and 5, and/or the controller 112 of FIGS. 1 and 9. Example operations of blocks 1102, 1104, 1106, 1108, 1110, 1112, 1114, 1116, 1118, 1120, 1122 may be used to implement block 1012 of FIG. 10. In particular, the example method 1012 of FIG. 10 is effective in configuring one or more of the aforementioned electronic components 110, 212, 602, 604, 606, 702, 704, 706, 708, 710, 802, 804, 806, 808 for operation such that the electronic component(s) 110, 212, 602, 604, 606, 702, 704, 706, 708, 710, 802, 804, 806, 808 is/are fully operational.

The example method 1012 of FIG. 11 begins by identifying the first electronic component (block 1102). In some examples, the configuration system 900 of FIG. 9 identifies (e.g., via the data analyzer 906) the first electronic component 212. For example, the configuration system 900 detects one or more of a serial number, an ID number, etc. associated with the first electronic component 212 and indicative of a type of the first electronic component 212. Additionally or alternatively, in some examples, the configuration system 900 determines the type of the first electronic component 212 based on the first connector pattern 220 formed by the primary connectors 214 of the first electronic component 212, which is discussed in greater detail below in connection with FIG. 12.

The example method 1012 of FIG. 11 also includes determining whether the first electronic component includes a sensor module (block 1104). In some examples, the configuration system 900 of FIG. 9 determines (e.g., via the data analyzer 906) whether the first electronic component 212 includes a sensor module. If the configuration system 900 provides a positive determination (block 1104: YES), control of the example method 1012 of FIG. 11 proceeds to block 1106. On the other hand, if the configuration system 900 provides a negative determination (block 1104: NO), control of the example method 1012 of FIG. 11 returns to a calling function such as the example method 1000 of FIG. 10.

The example method 1012 of FIG. 11 also includes determining a calibration instruction associated with the sensor module (block 1106). In some examples, the configuration system 900 of FIG. 9 determines (e.g., via the data analyzer 906) at least one calibration instruction associated with the first electronic component 212 and/or the sensor module thereof based on the calibration instruction(s) 912 stored in the database 908.

The example method 1012 of FIG. 11 also includes determining whether the calibration instruction includes a user operation (block 1108). In some examples, the configuration system 900 of FIG. 9 determines (e.g., via the data analyzer 906) whether the calibration instruction determined in connection with block 1106 includes a user operation. If the configuration system 900 provides a positive determination (block 1108: YES), control of the example method 1012 of FIG. 11 proceeds to block 1110. On the other hand, if the configuration system 900 provides a negative determination (block 1108: NO), control of the example method 1012 of FIG. 11 proceeds to block 1114.

The example method 1012 of FIG. 11 also includes notifying a user of the calibration instruction via an output device (block 1110). In some examples, the configuration system 900 of FIG. 9 notifies (e.g., via the user interface 904) a user of the calibration instruction determined in connection with block 1106 via the output device(s) 124. For example, the configuration system 900 controls the output device(s) 124 to generate visual data and/or audible data instructing the user to place a target at a predetermined location relative to the vehicle 100 (e.g., 20 feet in front of the vehicle 100) for detection by (a) the first electronic component 212 and/or (b) one or more matching electronic components installed on the vehicle 100.

The example method 1012 of FIG. 11 also includes calibrating the first electronic component based on sensor data obtained in connection with the user operation (block 1112). In some examples, the configuration system 900 of FIG. 9 calibrates (e.g., via the calibrator 907) the first electronic component 212 and/or the sensor module thereof based on a portion of the sensor data 914 obtained in connection with the user operation at block 1110.

The example method 1012 of FIG. 11 also includes determining whether a second electronic component installed on the vehicle matches the first electronic component block 1114). In some examples, the configuration system 900 of FIG. 9 determines (e.g., via the data analyzer 906) whether one of the other electronic components 110, 602, 604, 606, 702, 704, 706, 708, 710, 802, 804, 806, 808 of the connection system 102 matches the first electronic component 212. If the configuration system 900 provides a positive determination (e.g., the first electronic component 212 and the fifth electronic component 702 include the same type of sensor module) (block 1114: YES), control of the example method 1012 of FIG. 11 proceeds to block 1116. On the other hand, if the configuration system 900 provides a negative determination (e.g., the first electronic component 212 and the fifth electronic component 702 do not include the same type of sensor module) (block 1114: NO), control of the example method 1012 proceeds to block 1118.

The example method 1012 of FIG. 11 also includes calibrating the first electronic component based on sensor data generated by the second electronic component (block 1116). In some examples, the configuration system 900 of FIG. 9 calibrates (e.g., via the calibrator 907) the first electronic component 212 based on a portion of the sensor data 914 generated by the fifth electronic component 702.

The example method 1012 of FIG. 11 also includes detecting one or more connectors of the mounting feature that are connected to the first electronic component (block 1118). In some examples, the configuration system 900 of FIG. 9 detects (e.g., via the calibrator 907) one or more of the secondary connectors 210 of the first mounting feature 104 that are connected to the first electronic component 212. For example, the configuration system 900 detects which ones of the secondary connectors 210 are in direct contact with the primary connectors 214 based on the electrical connections provided by the primary and secondary connectors 214, 210.

The example method 1012 of FIG. 11 also includes determining a relative location and/or orientation of the first electronic component based on predetermined positional data associated with the connector(s) (block 1120). In some examples, the configuration system 900 of FIG. 9 determines (e.g., via the calibrator 907) a relative location and/or orientation of the first electronic component 212 based on a portion of the connector positional data 916 associated with the connected one(s) of the secondary connectors 210. That is, based on such data 916, the configuration system 900 determines (a) a location of the first electronic component 212 relative to the vehicle 100 and/or (b) an orientation of the first electronic component 212 relative to the vehicle 100.

The example method 1012 of FIG. 11 also includes calibrating the first electronic component based on the relative location and/or orientation (block 1122). In some examples, the configuration system 900 of FIG. 9 calibrates (e.g., via the calibrator 907) the first electronic component 212 based on the location and/or orientation determined in connection with block 1120. After performing the example operation of block 1120, the example method 1012 of FIG. 11 returns to a calling function such as the example method 1000 of FIG. 10.

Although the example method 1012 is described in connection with the flowchart of FIG. 11, other methods of implementing the example configuration system 900 may alternatively be used. For example, the order of execution of the blocks 1102, 1104, 1106, 1108, 1110, 1112, 1114, 1116, 1118, 1120, 1122 may be changed, and/or some of the blocks 1102, 1104, 1106, 1108, 1110, 1112, 1114, 1116, 1118, 1120, 1122 described may be changed, eliminated, or combined. Further, in examples where two or more of the electronic components 110, 212, 602, 604, 606, 702, 704, 706, 708, 710, 802, 804, 806, 808 are operatively coupled to the vehicle 100 via the mounting feature(s) 104, 106, 108, the blocks 1102, 1104, 1106, 1108, 1110, 1112, 1114, 1116, 1118, 1120, 1122 can be executed more than once to configure those electronic components 110, 212, 602, 604, 606, 702, 704, 706, 708, 710, 802, 804, 806, 808.

FIG. 12 is a flowchart representative of an example method 1102 that can be executed to implement the example configuration system 900 of FIG. 9 to identify an electronic component operatively coupled to a vehicle. The example method 1102 of FIG. 11 can be implemented in any of the vehicle 100 of FIGS. 1 and 3-5, the connection system 102 of FIGS. 1, 2, 4, and 5, and/or the controller 112 of FIGS. 1 and 9. Example operations of blocks 1202, 1204, 1206, 1208, 1210, 1212, 1214 may be used to implement block 1102 of FIG. 11. In particular, the example method 1102 of FIG. 12 is effective in identifying one or more of the aforementioned electronic components 110, 212, 602, 604, 606, 702, 704, 706, 708, 710, 802, 804, 806, 808.

The example method 1102 of FIG. 12 begins by detecting connectors of the first electronic component that are connected to the mounting feature (block 1202). In some examples, the configuration system 900 of FIG. 9 detects (e.g., via the data analyzer 906) the primary connectors 214 of the first electronic component 212 when the primary connectors 214 are connected to the first mounting feature 104. That is, the configuration system 900 detects each of the primary connectors 214 that is in direct contact with one of the secondary connectors 210 based on the electrical connections provided by the primary and secondary connectors 214, 210.

The example method 1102 of FIG. 12 also includes determining types of the respective connectors (block 1204). In some examples, the configuration system 900 of FIG. 9 determines (e.g., via the data analyzer 906) types of the respective primary connectors 214 of the first electronic component 212. For example, the configuration system 900 determines that the first electronic component 212 includes one power connector, one ground connector, and two data connectors.

The example method 1102 of FIG. 12 also includes determining positions of the respective connectors relative to each other (block 1206). In some examples, the configuration system 900 of FIG. 9 determines (e.g., via the data analyzer 906) positions of the respective primary connectors 214 of the first electronic component 212 relative to the each other.

The example method 1102 of FIG. 12 also includes identifying a pattern formed by the connectors based on the types and/or the positions (block 1208). In some examples, the configuration system 900 of FIG. 9 identifies (e.g., via the data analyzer 906) the first connector pattern 220 formed by the primary connectors 214 based on the types and/or the positions determined in connection with blocks 1204, 1206.

The example method 1102 of FIG. 12 also includes comparing the pattern to predetermined pattern data indicative of a type of the electronic component (block 1210). In some examples, the configuration system 900 of FIG. 9 compares (e.g., via the data analyzer 906) the first connector pattern 220 identified in connection with block 1208 to the connector pattern data 918 in the database 908. As previously mentioned, the connector pattern data 918 is indicative of the type of the first electronic component 212.

The example method 1102 of FIG. 12 also includes determining whether the pattern matches a predetermined pattern (block 1212). In some examples, the configuration system 900 of FIG. 9 determines whether the first connector pattern 220 determined in connection with block 1208 matches a predetermined connector pattern in the connector pattern data 918 based on the comparison performed at block 1210. If the configuration system 900 provides a positive determination (block 1212: YES), control of the example method 1102 of FIG. 12 proceeds to block 1214. On the other hand, if the configuration system 900 provides a negative determination (block 1212: NO), control of the example method 1102 of FIG. 12 returns to a calling function such as the example method 1012 of FIG. 11.

The example method 1102 of FIG. 12 also includes determining the type of the first electronic component based on the comparison (block 1214). In some examples, the configuration system 900 of FIG. 9 determines (e.g., via the data analyzer 906) the type of the first electronic component 212 based on the comparison performed at block 1210. For example, based on the first connector pattern 220, the configuration system 900 determines that the first electronic component 212 is or includes at least one of a sensor module, an ECU, a light, a battery, etc. After performing the operation of block 1214, control of the example method 1102 of FIG. 12 returns to a calling function such as the example method 1012 of FIG. 11.

Although the example method 1102 is described in connection with the flowchart of FIG. 12, other methods of implementing the example configuration system 900 may alternatively be used. For example, the order of execution of the blocks 1202, 1204, 1206, 1208, 1210, 1212, 1214 may be changed, and/or some of the blocks 1202, 1204, 1206, 1208, 1210, 1212, 1214 described may be changed, eliminated, or combined. Further, in examples where two or more of the electronic components 110, 212, 602, 604, 606, 702, 704, 706, 708, 710, 802, 804, 806, 808 are operatively coupled to the vehicle 100 via the mounting feature(s) 104, 106, 108, the blocks 1202, 1204, 1206, 1208, 1210, 1212, 1214 can be executed more than once to identify those electronic components 110, 212, 602, 604, 606, 702, 704, 706, 708, 710, 802, 804, 806, 808.

Figure 13:
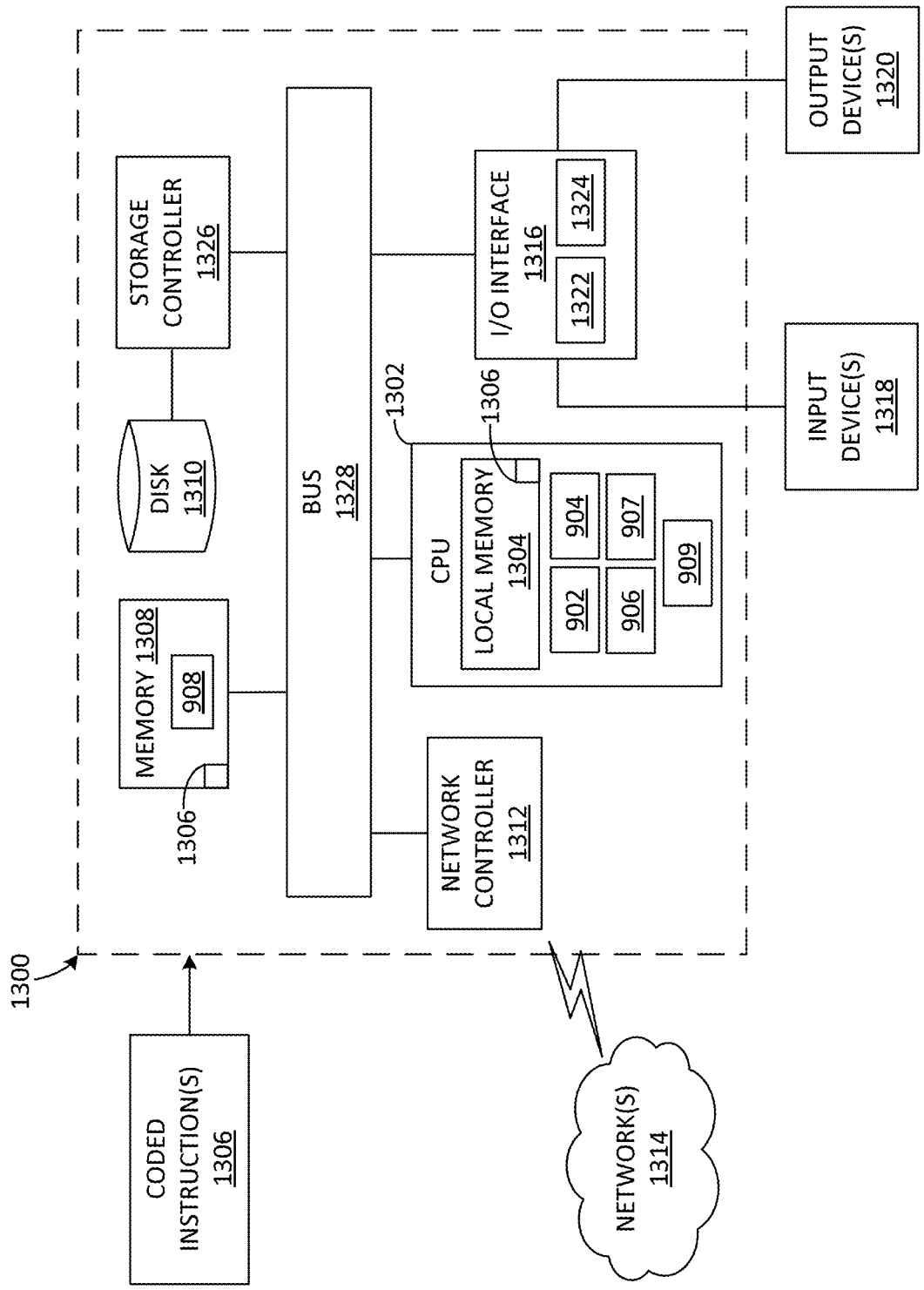
FIG. 13 is a block diagram of an example processor platform structured to execute instructions to carry out the methods of FIGS. 11 and 12 and/or, more generally, to implement the configuration system of FIG. 9.

FIG. 13 is a block diagram of an example processor platform 1300 structured to execute instructions to carry out the methods of FIGS. 11 and 12 and/or, more generally, to implement the configuration system 900 of FIG. 9. For example, the processor platform 1300 can be a personal computer, a server, a mobile device (e.g., a cell phone, a smart phone, a tablet, etc.) or any other type of computing device. According to the illustrated example of FIG. 13, the processor platform 1300 includes a central processing unit (CPU) 1302 (sometimes referred to as a processor), which is hardware (e.g., one or more integrated circuits, logic circuits, microprocessors, etc.). The CPU 1302 of FIG. 1300 includes a local memory 1304 such as, for example, a cache. According to the illustrated example of FIG. 1300, the CPU 1302 implements the example component interface 902, the example user interface 904, the example data analyzer 906, the example calibrator 907, and the example network interface 909.

Coded instruction(s) 1306 to implement the method of FIGS. 11 and 12 may be stored in a main memory 1308 of the processing platform 1300. The memory 1308 may include a volatile memory (e.g., random access memory device(s) such as Dynamic Random Access Memory (DRAM)) and a non-volatile memory (e.g., flash memory). Such processes and/or instructions may also be stored on a storage medium disk 1310 associated with the processor platform 1300, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processing platform 1300 communicates, such as a server or computer. According to the illustrated example of FIG. 13, the main memory 1308 implements the example database 908.

Further, the claimed advancements may be provided as a utility application, background daemon, or component of an operating system, or combination thereof, executing in conjunction with the CPU 1302 and an operating system such as, for example, Microsoft Windows 7, UNIX, Solaris, LINUX, Apple MAC-OS or any other system(s) known to those skilled in the art.

The hardware elements in order to achieve the processing platform 1300 may be realized by various circuitry elements, known to those skilled in the art. For example, the CPU 1302 may be a Xenon or Core processor from Intel of America or an Opteron processor from AMD of America, or may be other processor types that would be recognized by one of ordinary skill in the art. Alternatively, the CPU 1302 may be implemented on an FPGA, ASIC, PLD or using discrete logic circuits, as one of ordinary skill in the art would recognize. Further, the CPU 1302 may be implemented as multiple processors cooperatively working in parallel to perform the instructions of the inventive processes described above.

In some examples, the processor platform 1300 of FIG. 1300 also includes a network controller 1312 such as, for example, an Intel Ethernet PRO network interface card from Intel Corporation of America for interfacing with one or more networks 1314. As can be appreciated, the network(s) 1314 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 1314 can also be wired, such as an Ethernet network, or can be wireless such as a cellular network including EDGE, 3G and 4G wireless cellular systems. The wireless network can also be WiFi, Bluetooth, or any other wireless form of communication that is known.

The processing platform 1300 of FIG. 1300 includes a general purpose I/O interface circuit 1316 that interfaces and/or otherwise communicates with one or more input devices 1318 and/or one or more output devices 1320. The I/O interface circuit 1316 of FIG. 1300 may be implemented as an Ethernet interface, a universal serial bus (USB), a PCI express interface, and/or any other type of standard interface.

The input devices 1318 are connected to the I/O interface 1316 and may include, for example, a keyboard, a mouse, a touchscreen, a button, a microphone, a voice recognition system, a camera, and/or any other suitable device(s) for enabling a user to input data and/or commands to the CPU 1302. As such, in some examples, the I/O interface circuit 1316 typically includes a display controller 1322 such as, for example, a NVIDIA GeForce GTX or Quadro graphics adaptor from NVIDIA Corporation of America for interfacing with a display (e.g., a Hewlett Packard HPL2445w LCD monitor).

The output device(s) 1320 are also connected to the I/O interface circuit 1316 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit includes a sound controller 1324 such as, for example, Sound Blaster X-Fi Titanium from Creative, to interface with a speaker and/or a microphone.

The processor platform 1300 of FIG. 1300 also includes a general purpose storage controller 1326 that connects the storage medium disk 1310 with a communication bus 1328. The storage controller 1326 may also control access to the memory 1308. The communication bus 1328 of FIG. 1300 may be an ISA, EISA, VESA, PCI, etc. for interconnecting all of the components of the processor platform 1300. For example, the CPU 1302 communicates with the main memory 1308 via the bus 1328.

It will be appreciated that the systems, apparatus, and methods disclosed in the foregoing description provide numerous advantages. Examples disclosed herein provide a modular vehicle connection system including one or more mounting features that are positioned on an exterior portion of a vehicle and aid in installing, uninstalling, and/or replacing one or more electronic components of the vehicle. Disclosed examples reduce costs and/or time typically associated with installing, uninstalling, and/or replacing such vehicle electronic components.

Although certain example systems, apparatus, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A connection system for a vehicle, comprising:
an electronic component separate from the vehicle, the electronic component including a sensor module; multiple primary connectors coupled to a body of the electronic component and forming a connector pattern;
a mounting feature separate from the electronic component and positioned on a portion of the vehicle, the mounting feature including a substrate and multiple apertures defined by the substrate and forming an aperture pattern, the mounting feature configured to electrically couple the electronic component to a wiring system of the vehicle in response to insertion of the multiple primary connectors in the multiple apertures such that the connector pattern matches at least a portion of the aperture pattern, the mounting feature including multiple secondary connectors connected to the wiring system and disposed in or adjacent the multiple apertures, the secondary connectors configured to provide an electrical connection between the electronic component and the wiring system when the multiple primary connectors contact the multiple secondary connectors, wherein the mounting feature is configured to carry the electronic component while the vehicle is moving; and
a vehicle controller structured to detect the electronic component and, in response to the detection, configure the electronic component for operation, the vehicle controller being configured to:
identify the electronic component by
detecting the multiple primary connectors that are connected to the mounting feature,
determining types of the multiple primary connectors,
determining positions of the multiple primary connectors relative to each other,
identifying the connector pattern formed by the multiple primary connectors based on at least one of the types or positions of the multiple primary connectors, and
identifying the electronic component based on the connector pattern;
obtain a calibration instruction from the electronic component;
control an output device to instruct a user to perform a user operation associated with calibrating the electronic component;
identify a second electronic component that is installed on the vehicle and matches the electronic component;
determine a location of the electronic component relative to the vehicle based on predetermined positional data associated with the mounting feature; and
calibrate the electronic component based on the location of the electronic component, the calibration instruction, sensor data obtained in connection with the user operation, and data generated by the second electronic component.

2. The connection system of claim 1, wherein the multiple primary connectors are configured to engage a surface of the substrate defining the multiple apertures to removably couple the electronic component to the mounting feature.

3. The connection system of claim 1, wherein the multiple apertures are evenly spaced from each other.

4. The connection system of claim 1, wherein:
the substrate includes a body panel of the vehicle, and
the multiple apertures include holes or recesses that are positioned along a body line of the body panel.

5. The connection system of claim 1, further including multiple mounting features that are positioned on different areas of the vehicle, each of the multiple mounting features configured to receive the electronic component and electrically couple the electronic component to the wiring system of the vehicle.

6. The connection system of claim 1, wherein the electronic component is part of a sensor suite including multiple electronic components receivable by the mounting feature, the mounting feature configured to electrically couple all of the multiple electronic components of the sensor suite to the wiring system.

7. The connection system of claim 1, further including a shell forming an outer surface of the vehicle, the shell configured to couple to the vehicle and urge the electronic component into engagement with the mounting feature.

* * * * *